United States Patent [19]

Sawada

[11] Patent Number: 5,541,796
[45] Date of Patent: Jul. 30, 1996

[54] CASSETTE CASE BOARD AND RELEASE PART FOR RECORDING MEDIUM CASSETTE

[75] Inventor: Takashi Sawada, Kanagawa, Japan

[73] Assignee: Sony Corporation, Tokyo, Japan

[21] Appl. No.: 305,083

[22] Filed: Sep. 13, 1994

[30] Foreign Application Priority Data

Sep. 14, 1993 [JP] Japan .................................. 5-250960

[51] Int. Cl.⁶ ........................... G11B 15/06; G11B 19/02
[52] U.S. Cl. ........................... 360/132; 360/60; 242/338; 242/344
[58] Field of Search ................................ 360/97.01, 132, 360/133, 137; 242/338, 341, 344; 369/291, 292

[56] References Cited

U.S. PATENT DOCUMENTS

| Re. 34,190 | 3/1993 | Rubinstein | 439/67 |
|---|---|---|---|
| 4,593,337 | 6/1986 | Leone et al. | 360/132 |
| 4,965,691 | 10/1990 | Iftikar et al. | 360/133 |
| 5,201,665 | 4/1993 | McCardell, Jr. et al. | 439/157 |
| 5,291,346 | 3/1994 | Baekgaard | 360/60 |
| 5,390,870 | 2/1995 | Sawada et al. | 242/344 |

FOREIGN PATENT DOCUMENTS

| 0163567 | 12/1985 | European Pat. Off. . |
|---|---|---|
| 0616325 | 9/1994 | European Pat. Off. . |
| 63-13187 | 1/1988 | Japan . |
| 63-71993 | 4/1988 | Japan | 360/133 |
| 63-206953 | 8/1988 | Japan . |
| 2-41590 | 2/1990 | Japan | 360/132 |
| WO91/02355 | 2/1991 | WIPO . |

OTHER PUBLICATIONS

IBM Technical Disclosure Bulletin; vol. 25, #4; Sep. 1982; "Low Cost Cartridge Code Detector"; Craft.

Primary Examiner—Stuart S. Levy
Assistant Examiner—Jefferson Evans
Attorney, Agent, or Firm—William S. Frommer; Alvin Sinderbrand

[57] ABSTRACT

A recording medium cassette comprises a cassette case cassette case board and a release part. The cassette case board has a plurality of board terminals and also has positioning holes formed in its outer surface so as to expose the plurality of board terminals along with insertion guide channels formed consecutively at the lower ends of the positioning holes so as to reach the lower end of the cassette case. Also, a release part slopes towards the lower end of the insertion guide channel away from the outer surface. The angle of the release part with respect to the height of the cassette case is greater than the angle of an inclined portion, which spans from contact points to free end parts of resilient connector contacts set up at a recording/playback apparatus connector, with respect to the height of the cassette case, and the connector contacts do not come into contact with the release part when the recording medium cassette is installed in the recording/playback apparatus and the contacts are therefore brought together in a reliable manner.

6 Claims, 27 Drawing Sheets

CASSETTE CASE BOARD AND RELEASE PART FOR RECORDING MEDIUM CASSETTE

BACKGROUND OF THE INVENTION

1. Field of the Invention

The present invention relates to a new recording medium cassette and more particularly to a new recording medium cassette whereby a number of board terminals for transmitting various items of information relating to the recording medium cassette to the side of a recording playback apparatus are formed in positioning holes formed in the external surface of the cassette case. These board terminals are exposed from the positioning holes such that the board terminals can make contact in a reliable manner with connector contacts set up in the recording/playback apparatus when the recording medium cassette is installed in the recording/playback apparatus so that each of the various items of information can be read.

2. Description of the Related Art

With recent recording medium cassettes such as, for example, tape cassettes, each of the items of information relating to the recording medium cassette, such as the recording contents, the type of recording media and whether recording is not permissible etc., is transmitted to the side of the recording/playback apparatus. Recording medium cassettes have therefore been used where a number of terminals for transmitting each of these various items of information to the recording/playback apparatus side are exposed from the external surface of the cassette case, so that control of recording and playback can be carried out in a way which is most appropriate for this recording media cassette.

However, one of the problems with using this kind of recording medium cassette is that when it is installed in the recording/playback apparatus, a prescribed part of the reading means on the recording/playback apparatus side, for example, the connector contacts, have to come securely into contact with a prescribed terminal on the side of the recording medium cassette.

Also, the recording medium cassette has a certain degree of freedom within the mechanism, known as the loading mechanism, for installing the recording medium cassette at a prescribed position in the recording/playback apparatus i.e. it is held with a certain amount of play to the right, left, forward and backward directions and the final installation position is decided by a position deciding mechanism.

The play of the cassette recording medium within the loading mechanism and the play in the direction of contact between the terminals and the connector contacts does not present a problem. However, shifts between the terminals and the connector contacts and shifts in the vertical direction as these contact positions are approached cause corresponding shifts in the position between the terminals and the connector contacts, which creates serious problems.

Depending on this kind of position shift, a connector contact may fall into a terminal part which is not its corresponding terminal part and the recording medium cassette may then be installed into its prescribed position without modification. This means that the correct information concerning the recording media cassette may not be transmitted to the recording/playback apparatus side. Also, depending on the circumstances, the connector contacts may change shape if subjected to an unreasonable amount of force, which may cause serious problems such as it not being possible to read the information thereafter.

SUMMARY OF THE INVENTION

As the present invention sets out to solve the aforementioned problems, a recording medium cassette comprises a cassette case, a cassette case board and a release part. The cassette case board has a plurality of board terminals and positioning holes are formed in the outer surface of the cassette case and in which the board terminals were formed so as to expose the plurality of board terminals. Insertion guide channels are formed consecutively at the outer surface of the cassette case at the lower ends of the positioning holes so as to reach the lower end of the cassette case. Also, a release part slopes towards the lower end of the insertion guide channel away from the outer surface. Here, the angle of the release part with respect to the height of the cassette case is greater than the angle of an inclined portion, which spans from contact points to free end parts of resilient connector contacts set up at a recording/playback apparatus connector, with respect to the height of the cassette case, and the connector contacts do not come into contact with the release part when the recording medium cassette is installed in the recording/playback apparatus.

Also, according to this invention, an inclined guide surface is formed at the circumferences of the positioning holes and the insertion guide channels at the outer surface of the cassette case so as to guide the connector contacts to the positioning holes and insertion guide channels.

According to this invention there is also a step which limits the lower end of the positioning holes and on which the lower end of the cassette case board rests, with the surface of the cassette board extending outwardly to a greater extent than the front end of the step.

Further, according to this invention, a reference hole into which a reference axis for the recording playback apparatus is inserted is formed in the vicinity of the cassette case board equipped with board terminals which extend from the positioning holes at the lower part of the cassette case.

Therefore, when the recording medium cassette of the present invention is properly installed, the connector contacts are first inputted to the input guide channels and then guided by these guide channels into the positioning holes from which the board terminals are exposed. The connector contacts are therefore accurately guided into the positioning holes for their corresponding board terminals.

Also, the incline of the release parts for the input guide channels is greater than the incline of the inclined portions of the connector contacts and the inclined portions of the connector contacts do not contact the release parts of the of the input guide channels but do contact a ridge at the upper end of the release parts for the input guide channels. Thus, the generation of dust due to frictional rubbing between the connector contacts and the cassette case can be kept to minimum.

DETAILED DESCRIPTION OF THE PREFERRED EMBODIMENTS

Embodiment

Figure 1:
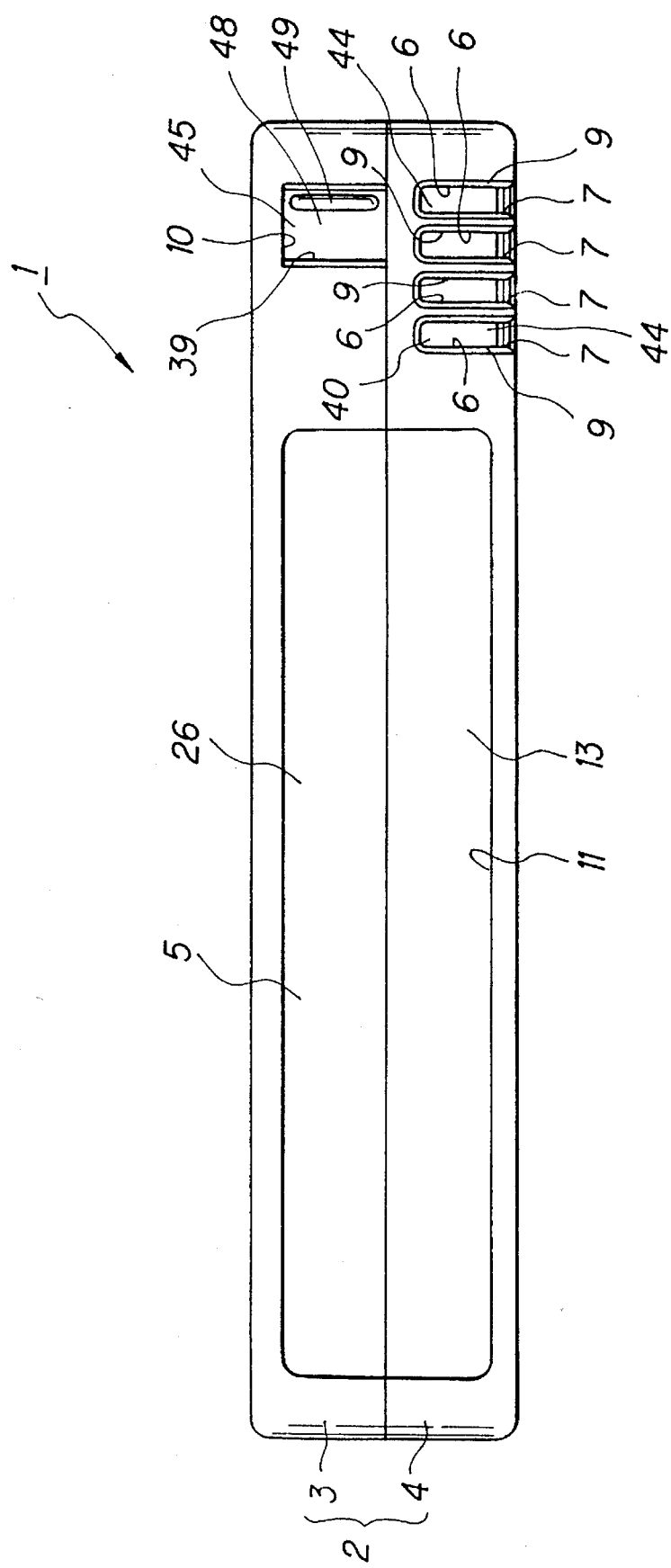
FIG. 1 is a rear elevational view of an example of an embodiment of a recording medium cassette case in accordance with the teachings of the present invention.

The following is a description of the details of a recording medium cassette for the present invention according to the embodiment shown in the diagrams.

In these embodiments, the present invention is applied to tape cassette 1 for use with video tape recorders.

The numeral 2 indicates a cassette case, which when viewed from above is of a flat, rectangular, oblong box-shape. Each end of a magnetic tape is attached to and wound around two separate tape reels (not shown) which are housed rotatably inside the cassette case 2.

The cassette case 2 is made up of an upper half 3 and a lower half 4 which are of thin plate shapes. These halves 2 and 3 are aligned so that their open sides meet.

FIG. 1 is a view of the entire rear surface 5 of the tape cassette 1. As shown therein, a row from left to right of four positioning holes 6, 6, . . . is formed at the right side of the lower half of the cassette case 2.

Insertion guide channels 7, 7, . . . which extend to the lower surface 2a of the cassette case 2 are formed consecutively at the lower ends of the positioning holes 6, 6 at the rear surface 5 of the cassette case 2. Vertical parts 7a are also formed consecutively in the longitudinal direction of the cassette case 2 along the lower ends of the positioning holes 6 at the surface facing the rear of the insertion guide channels 7. Also, inclined release parts which face downwardly and are shifted forwardly are formed consecutively as portions 7b at the lower ends of the vertical parts 7a.

A step 6a which forms the boundary of the lower ends of the positioning holes 6 is formed continuously at the upper ends of the vertical parts 7a of the insertion guide channels 7 so as to protrude forward slightly from the vertical plane with respect to the height of the cassette case 2.

Figure 2:
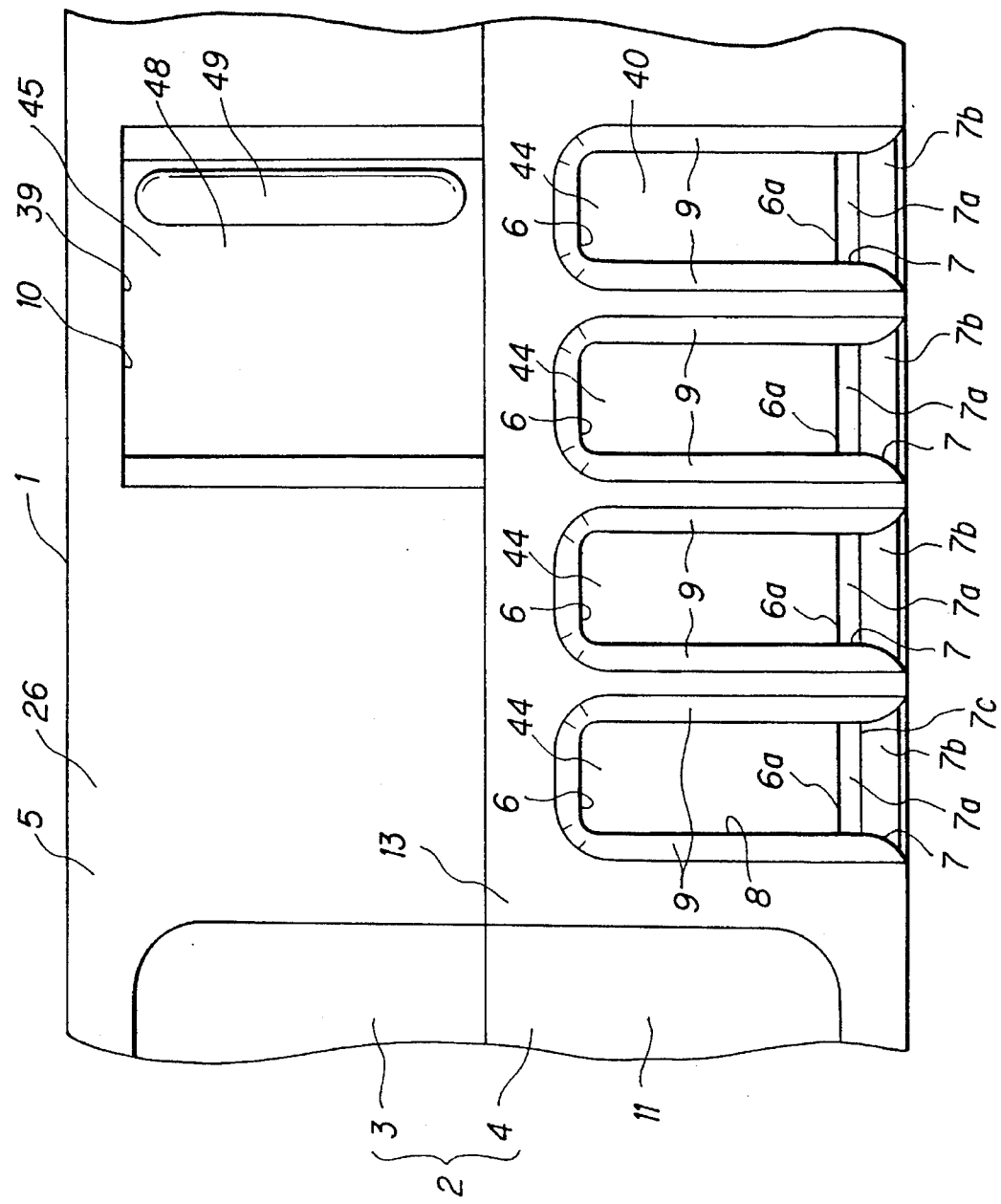
FIG. 2 is a rear enlarged elevational view of the right side portion of the recording medium cassette case of FIG. 1 specifically illustrating the positioning holes and the insertion guide channels thereof.
Figure 3:
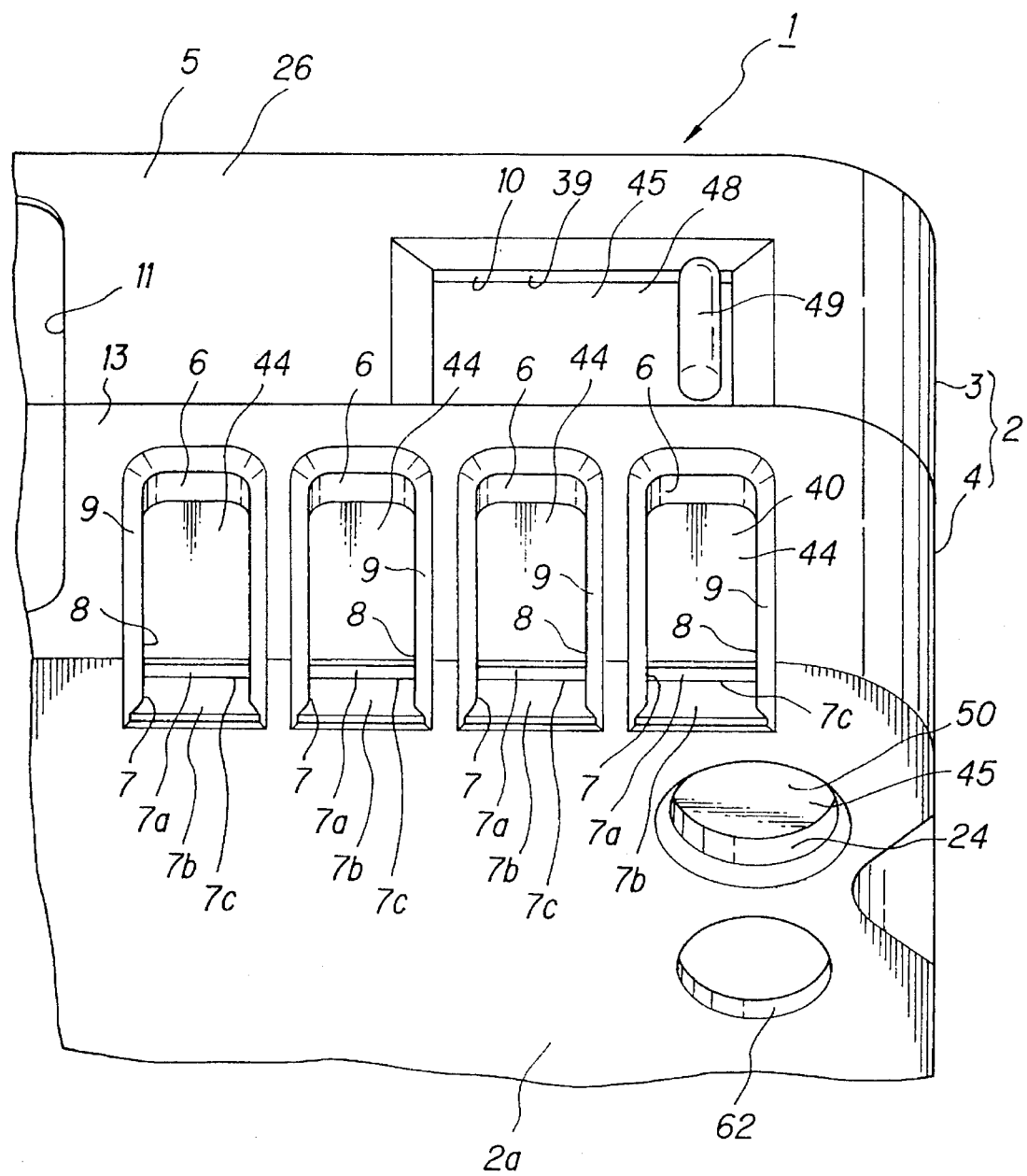
FIG. 3 is a rear perspective view of the right side portion of the recording medium cassette of FIG. 1.
Figure 4:
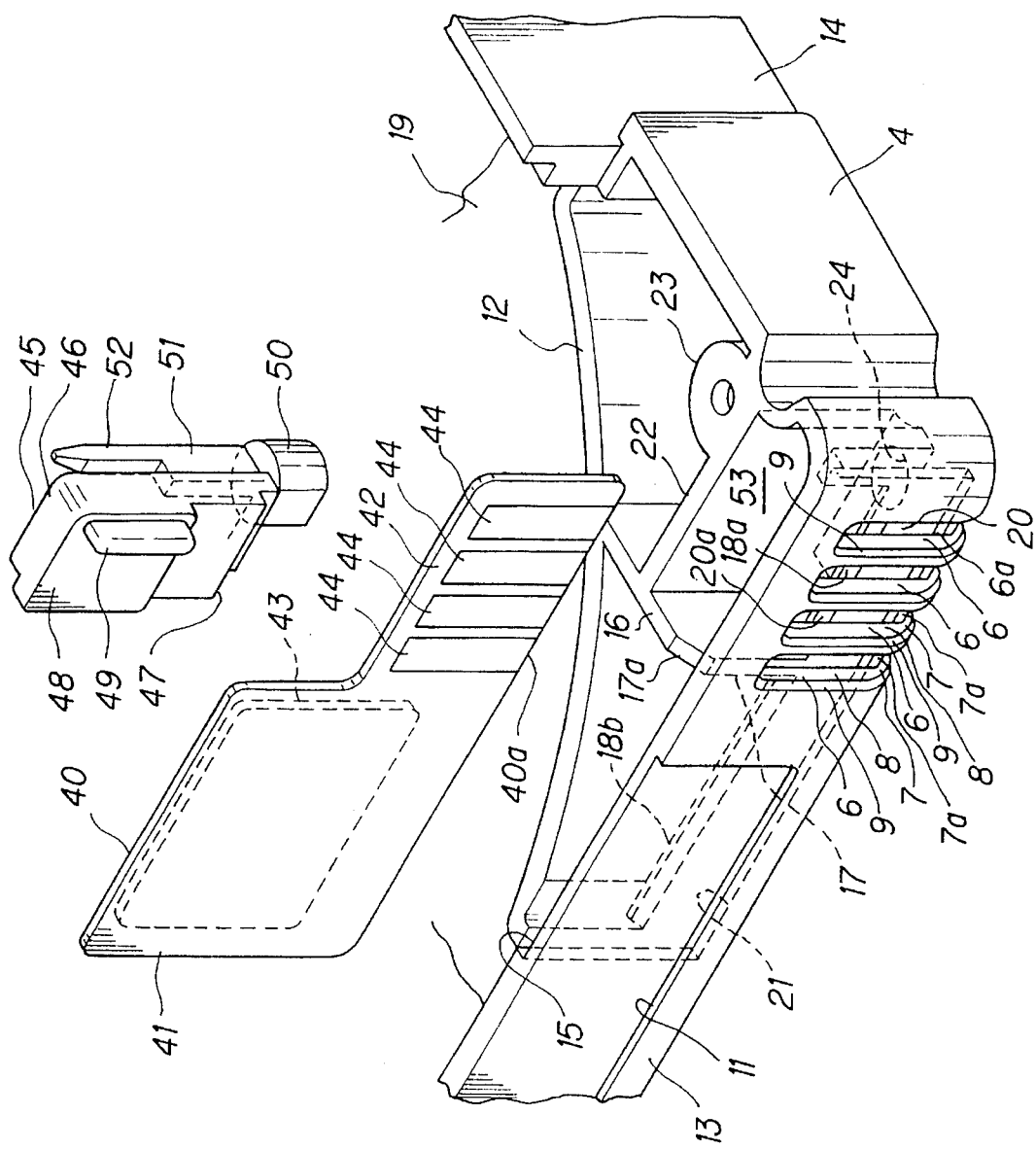
FIG. 4 is a top exploded perspective view of the recording medium cassette case of FIG. 2.
Figure 5:
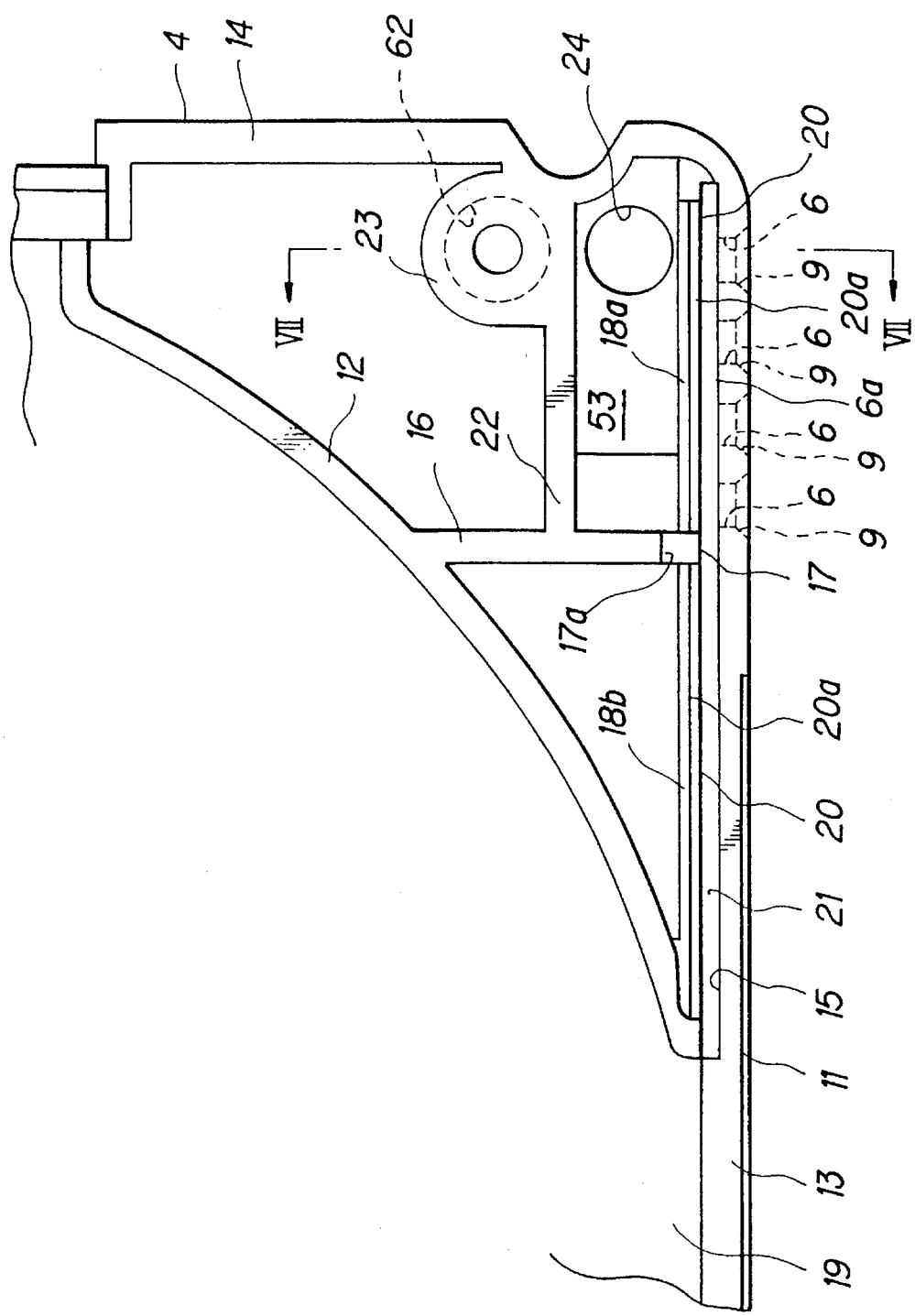
FIG. 5 is a top plan view of the portion of the cassette case of FIG. 4 with the bond terminals properly installed.
Figure 6:
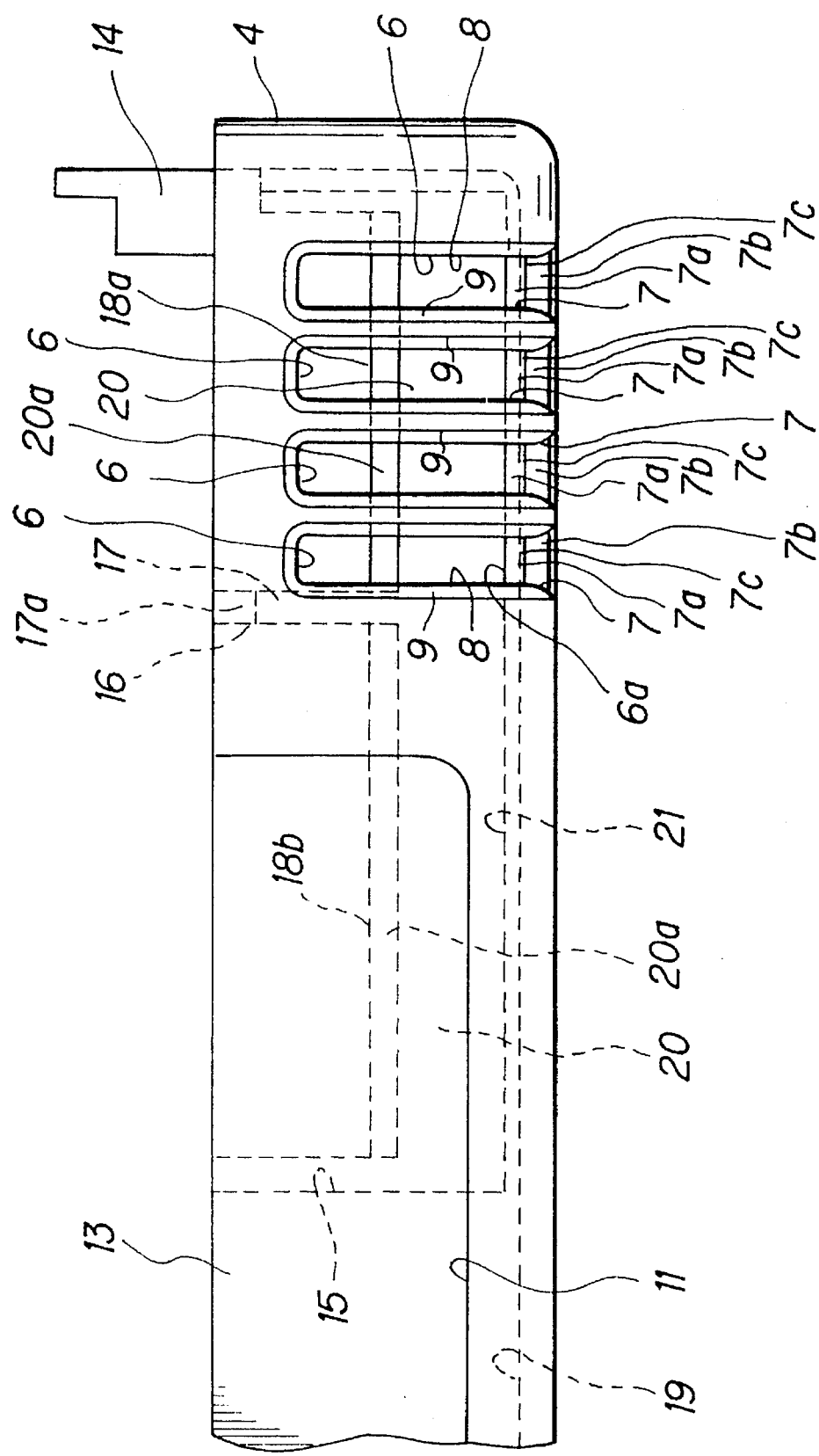
FIG. 6 is another rear enlarged elevational view of the right side portion of the recording medium cassette case of FIG. 1.
Figure 7:
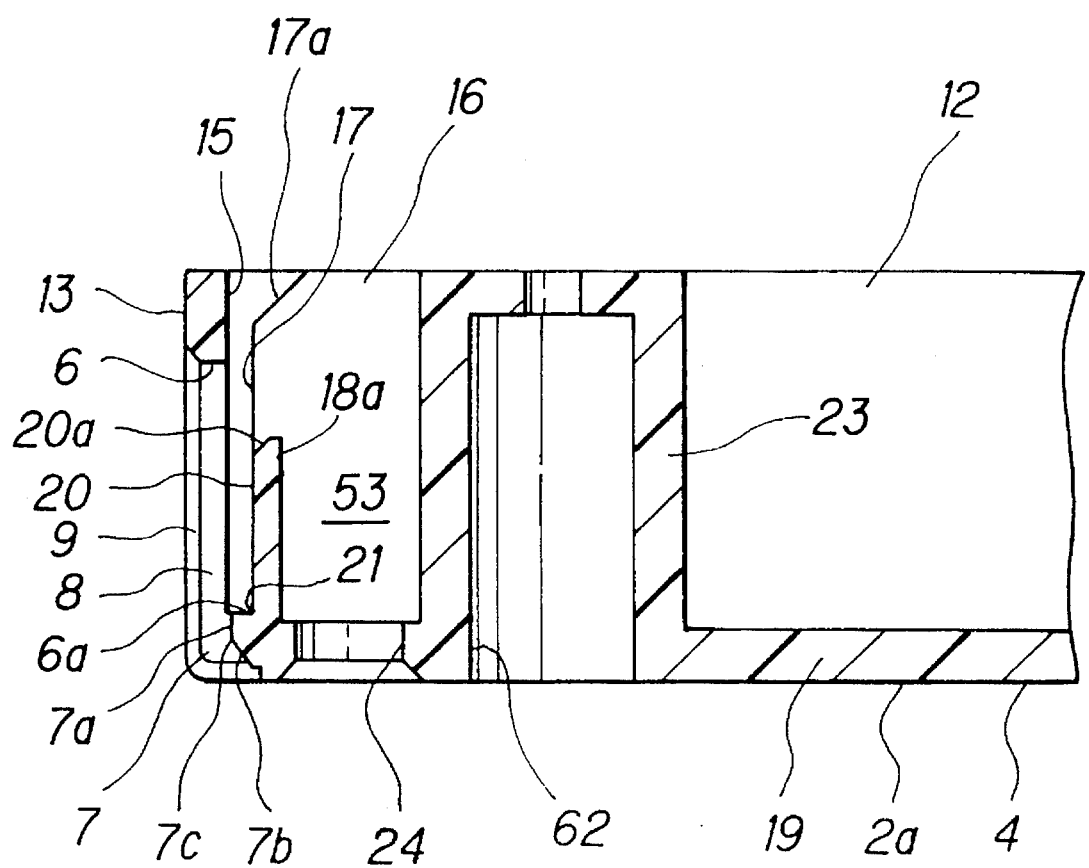
FIG. 7 is a cross-sectional view of the recording medium cassette case of the present invention taken along the line VII—VII of FIG. 5.
Figure 8:
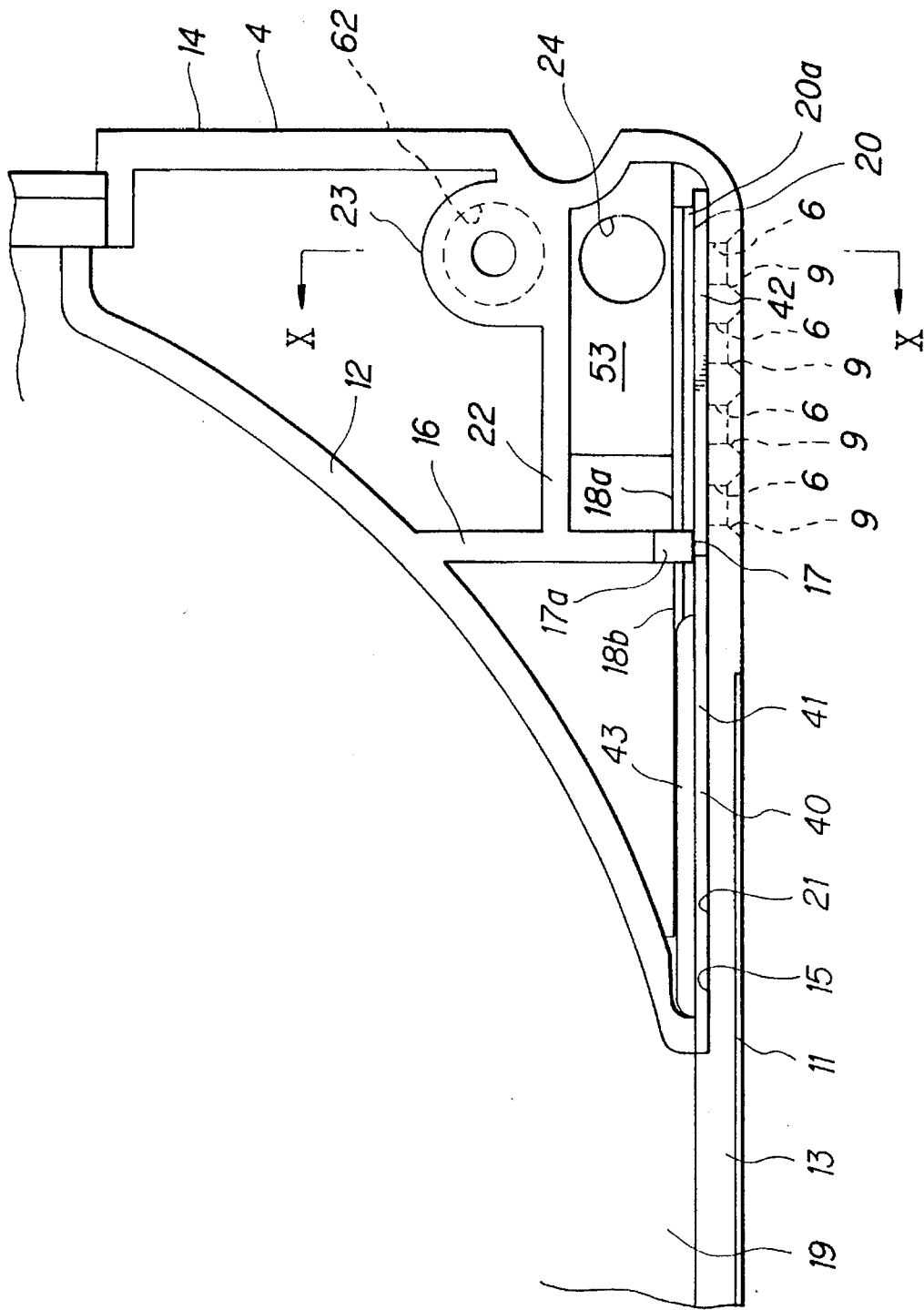
FIG. 8 is an enlarged top plan view specifically illustrating the lower half of the cassette case installed with the cassette case board.
Figure 9:
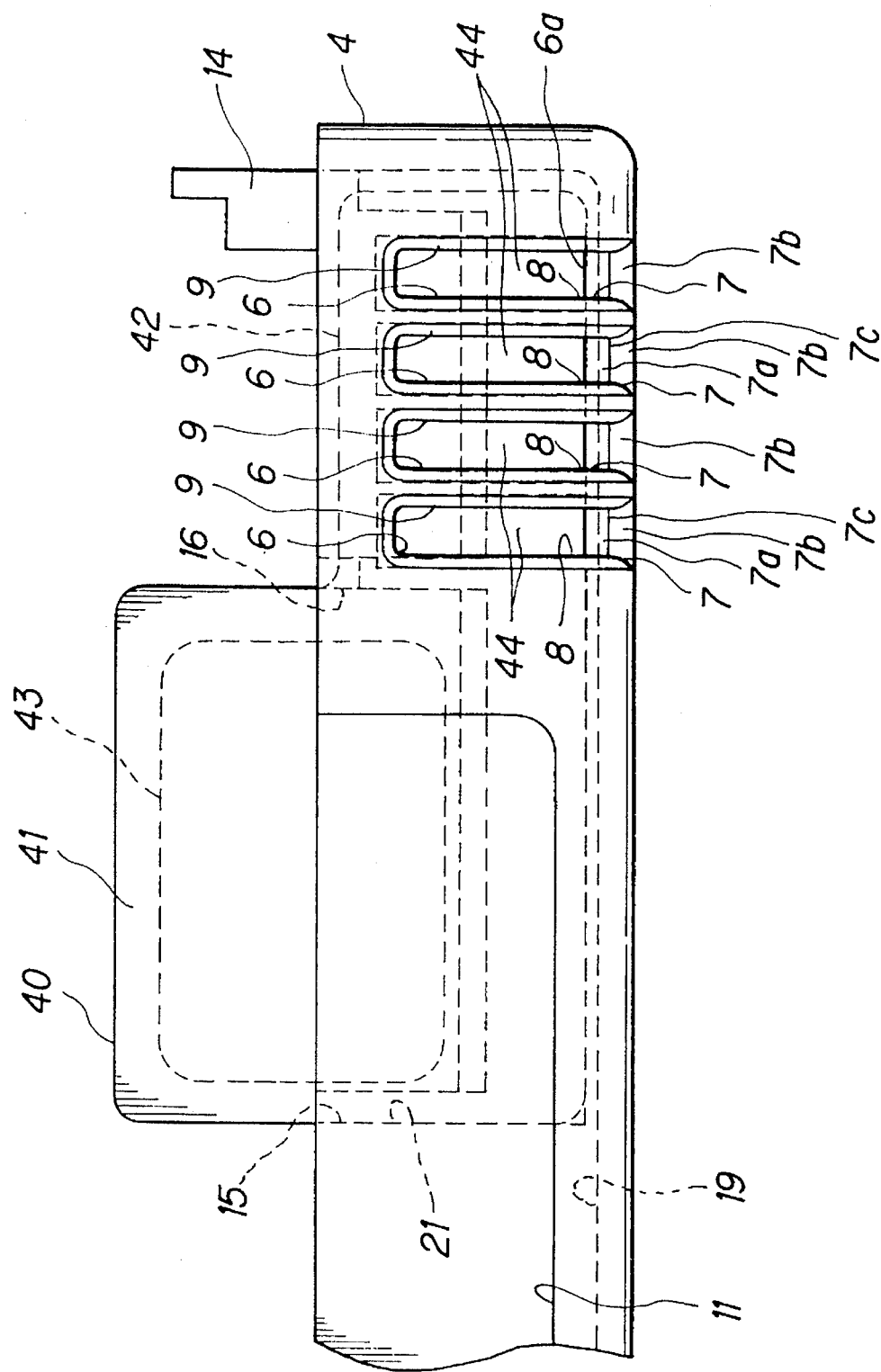
FIG. 9 is an enlarged rear elevational view specifically illustrating the lower half of the cassette case with the cassette case board in its installed position.
Figure 10:
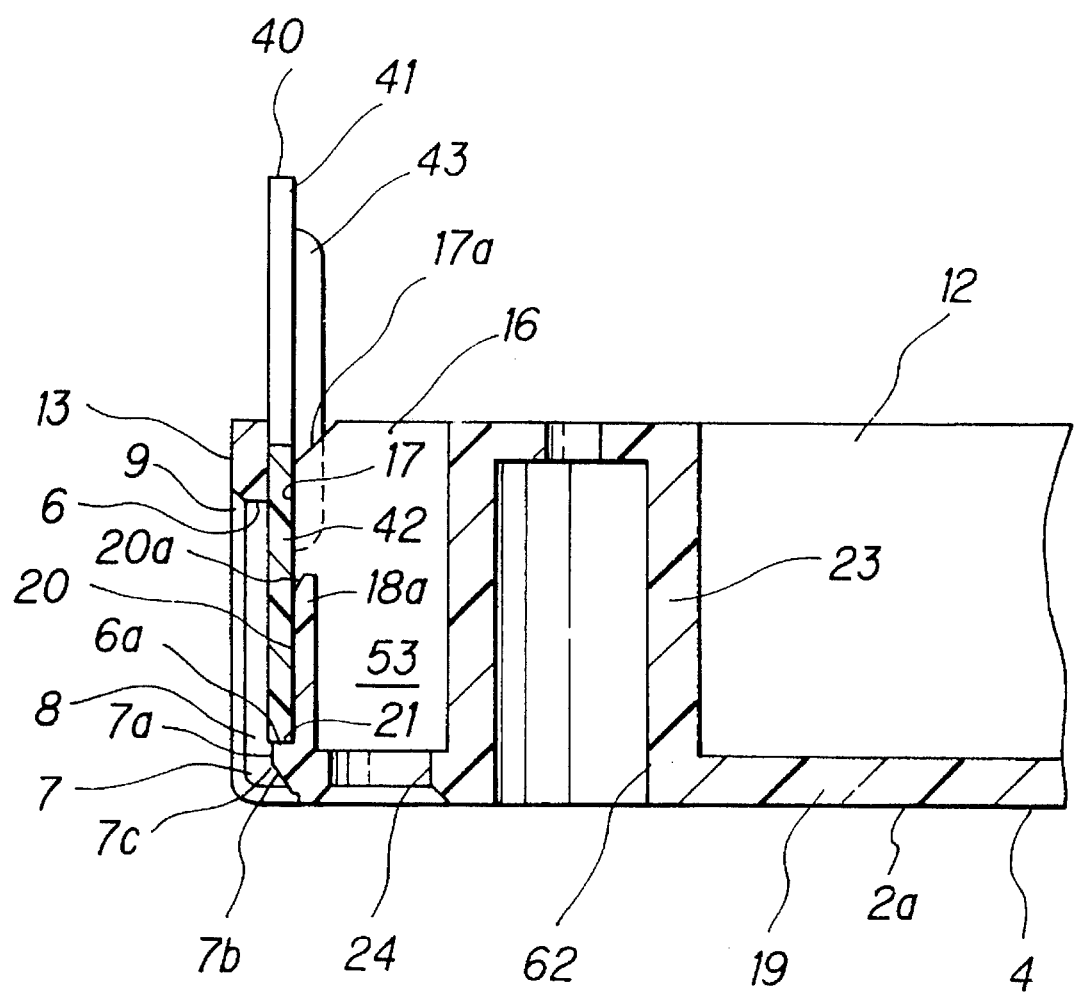
FIG. 10 is cross-sectional view taken along the line X—X of FIG. 8.
Figure 11:
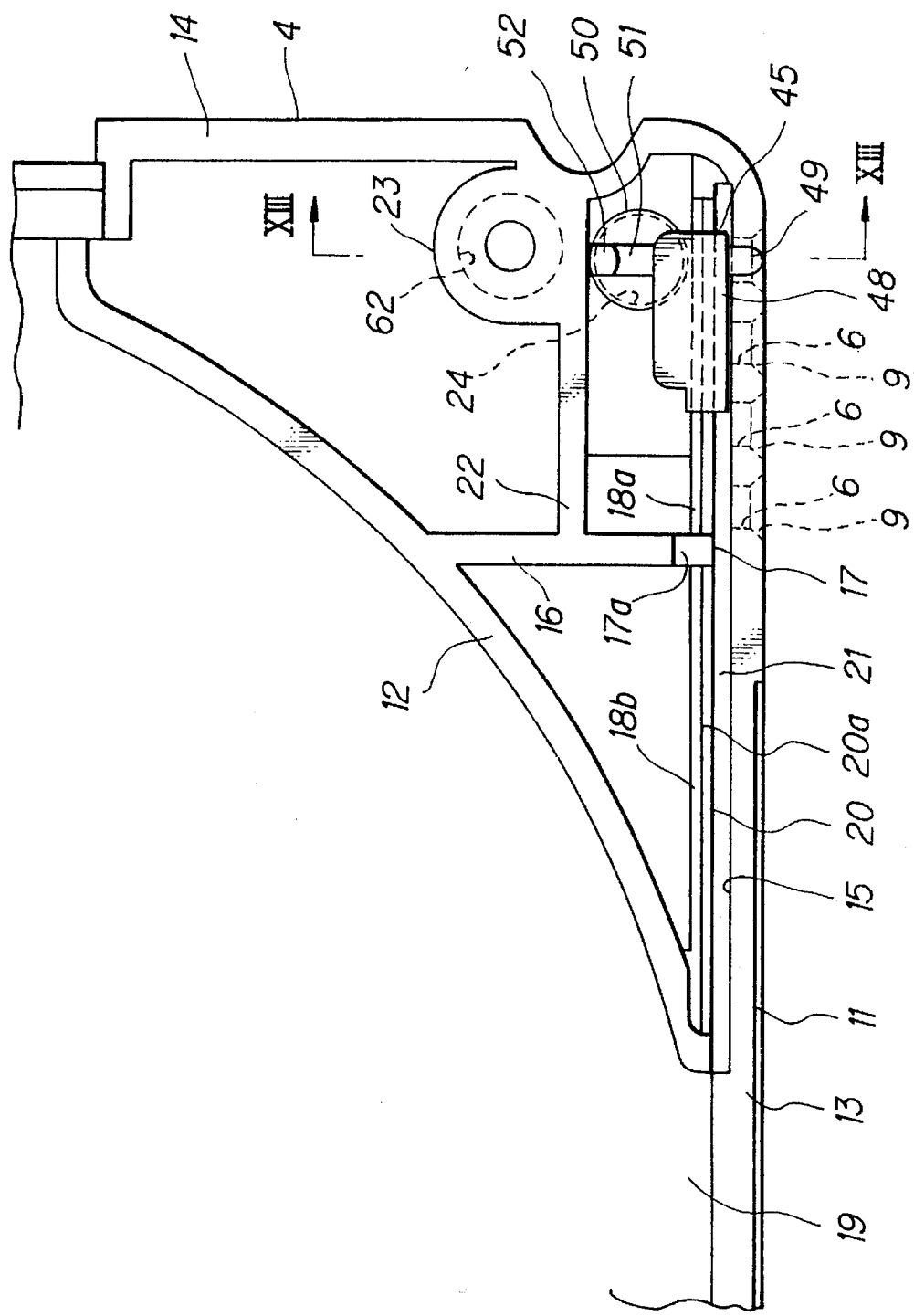
FIG. 11 is an enlarged top elevational view of the lower half of the cassette case with an accidental erasure prevention member installed.
Figure 12:
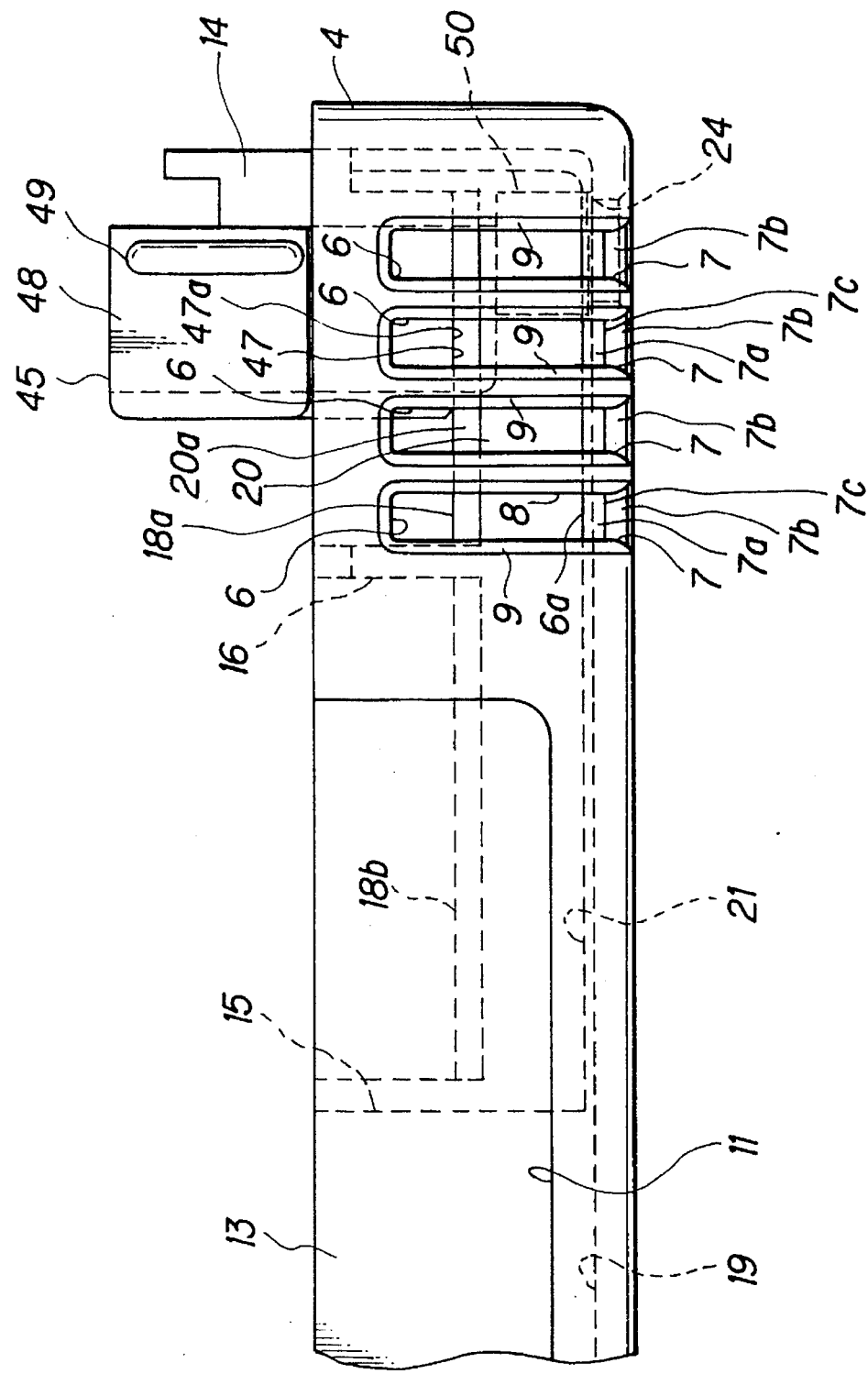
FIG. 12 is an enlarged rear elevational view of the lower half of the cassette case with the accidental erasure prevention member installed.
Figure 13:
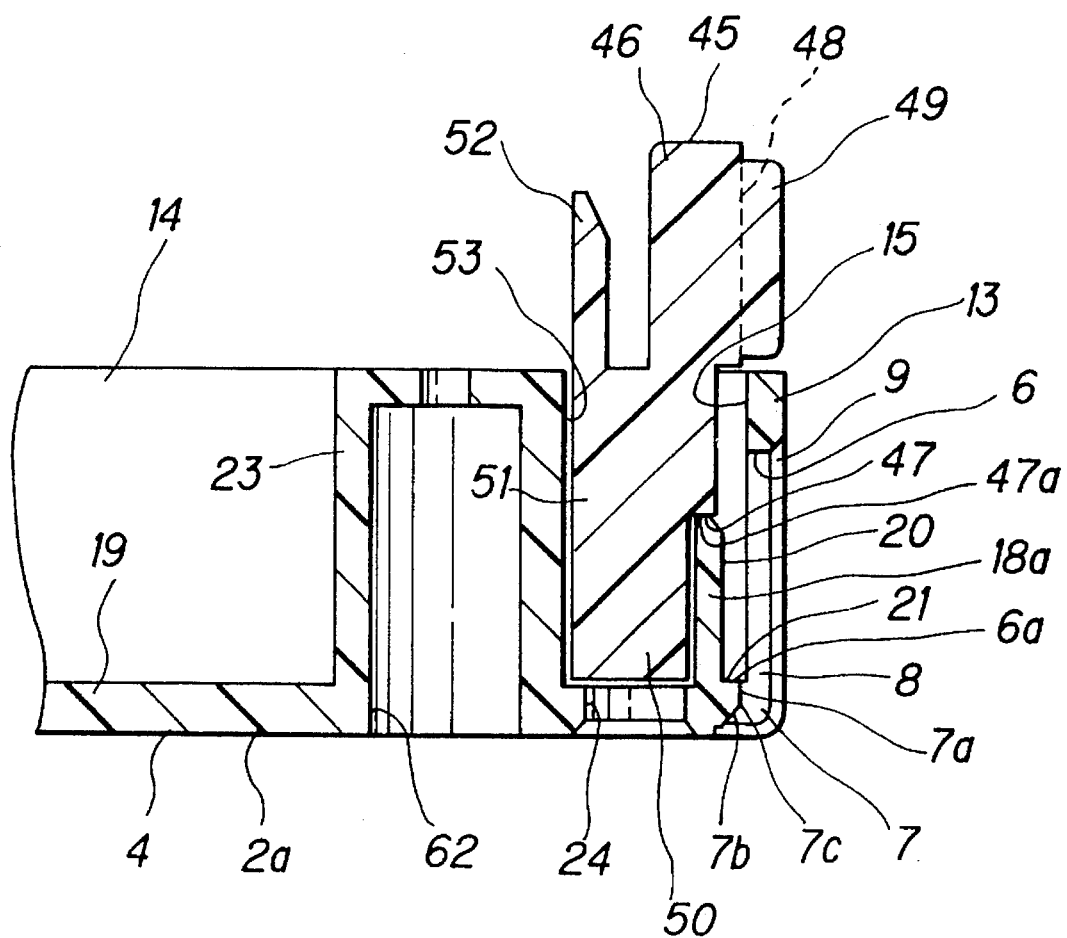
FIG. 13 is a cross-sectional view taken along the line XIII—XIII of FIG. 11.

As is shown in FIG. 2, a side edge 8 defines both sides of the portion which continues from the positioning holes 6 to the guide channel 7. A chamfer-shaped inclined guide surface 9 is then formed so as to run along the upper, side, and lower edges of the opening in the side part 8. Also, in FIG. 2, a flat inclined surface is shown as the inclined guide surface but a curved inclined surface can also be utilized.

A window 10 for preventing accidental erasure is formed in the upper half of the right end of the rear surface 5 of the cassette case 2, formed upwardly from the portion in which the positioning holes 6, 6, . . . are formed.

Numeral 11 indicates a first recess formed as a label sticking region on a portion of the rear surface 5 of the cassette case 2 other than the portions on which the positioning holes 6, 6, . . . and the accidental erasure prevention window 10 are provided.

Numeral 12 indicates a circular arc-shaped first partition formed in the rear right-hand end part of the lower half 4 which forms the boundary of one part of the tape reel arrangement region. One end of the first partition 12 extends from a lower rear wall 13 for the lower half 4 and the other end extends onto the right side wall 14.

Numeral 15 indicates a second recess notched up to the upper end of the inner surface of the lower rear wall 13. The second recess is formed from the right end of the lower rear wall 13 to a position where an end of the first partition 12 extends to the lower rear wall 13.

Numeral 16 indicates a first center wall formed so as to extend from a position approximately at the center of the first partition 12 in a direction towards the rear. The rear end of this wall finishes slightly before the second recess 15. There is also a first inclined edge 17a which rises from the front formed at the upper end of the rear edge 17 of the first center wall 16.

Numerals 18a and 18b indicate first and second presser walls positioned to extend from the surface of the lower wall 19 of the lower half. The first and second presser walls are positioned so as to leave a slight gap with the inner wall of the second recess 15. Their rear surfaces 20, 20 are therefore in the same plane as the first center wall 16 and the rear edge 17. Front rising inclined surfaces 20a, 20a are provided at the upper end parts of the rear surfaces 20 and 20 of the first and second presser walls 18a and 18b. A receiving channel 21 is then formed between the inner surface of the second recess 15, the rear surfaces 20, 20 of the first and second presser walls 18a and 18b, and the rear edge 17 of the first center wall 16.

Also, the extent of the exposure from the lower wall surface 19 of the first and second presser walls 18a and 18b is less than half that of the exposure from the lower wall surface 19 of the lower rear wall 13.

The positioning holes 6, 6, . . . are formed so as to be in communication with the second recess 15 formed in the lower rear wall 13. The upper ends of these positioning holes 6, 6, . . . extend to an end slightly down from the upper end of the lower rear wall 13. Also, the lower ends of the positioning holes 6, 6, . . . are bounded by the step 6a and the inner end of the step 6a is bounded by the rear face 20 of the first presser wall 18a.

Numeral 22 indicates a first limiting wall which extends to the right out from a position approximately at the center of the first center wall 16 to the right side wall 14. A lower hub 23 is then formed as a protrusion extending forwardly from this right end part.

Numeral 24 indicates an insertion guide hole formed in the right end part of a portion surrounded by the lower wall surface 19 of the lower rear wall 13, the right side wall 14, the first center wall 16 and the first limiting wall 22. This insertion guide hole 24 is positioned just to the rear of the lower hub 23.

Figure 14:
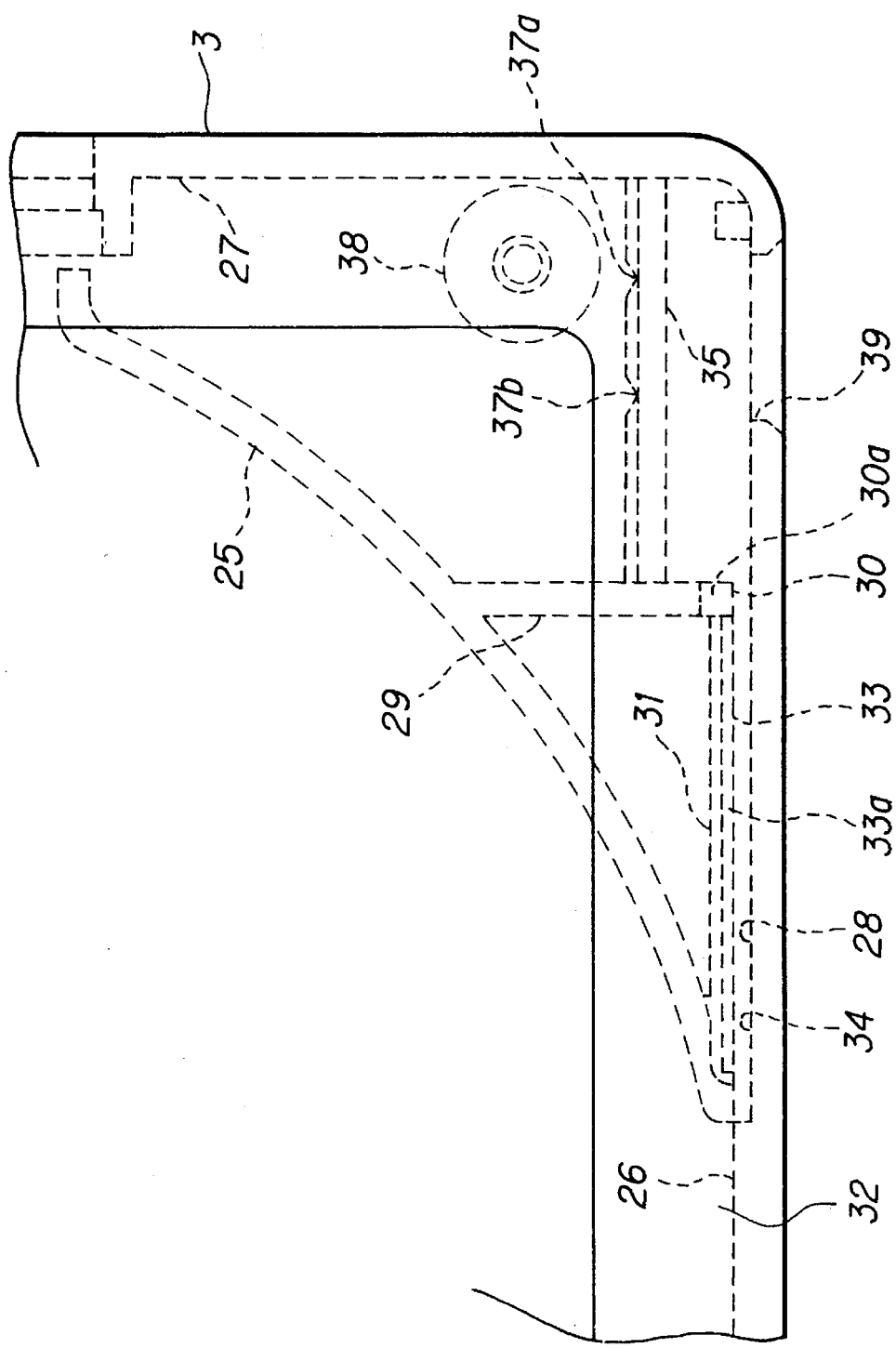
FIG. 14 is an enlarged elevational view of the essential parts of the upper half of the cassette case.
Figure 15:
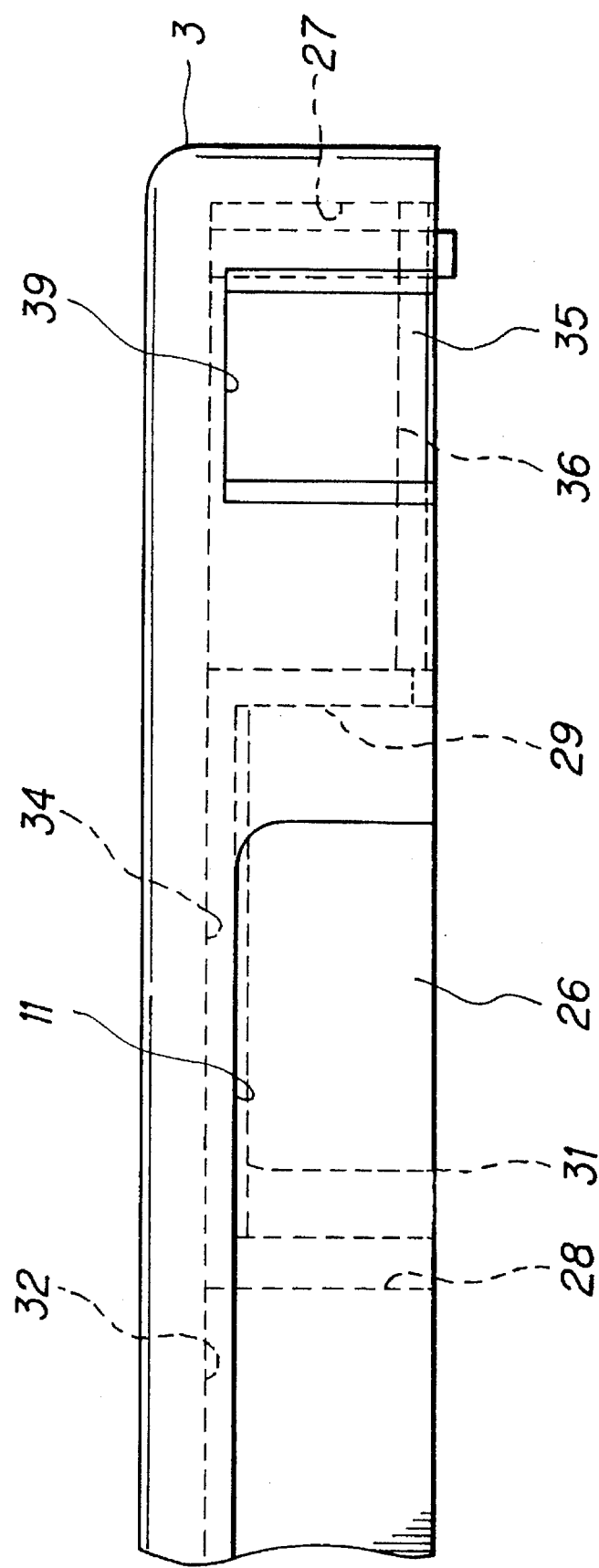
FIG. 15 is a rear elevational view of the upper half of the portions of the cassette case shown in FIG. 2.

Numeral 25 indicates a circular arc-shaped second partition (see FIG. 14) which bounds one part of the tape reel arrangement region formed at the right end of the rear of the upper half 3 so as to correspond with the position of the first partition 12 in the lower half 4. One end of this second partition 25 extends from the upper half 3 of the upper rear wall 26 and the other end extends to the right side wall 27.

Numeral 28 indicates a third recess set into the lower end of the inner surface of the upper rear wall 26. The third recess 28 is formed from the right end of the upper rear wall 26 to a position where an end of the second partition 25 extends to the upper rear wall 26. The third recess 28 is formed so as to correspond with the second recess 15 of the lower half 4.

Numeral 29 indicates a second center wall extending out in the rear direction from a portion at the approximate center of the second partition 25. The rear end edge 30 of the second center wall 29 stops just slightly to the near side of the third recess 28, with the lower end part of a rear end edge 30 being inclined so as to rise at the front as a second inclined edge 30a. This second center wall 29 is also formed so as to correspond with the position of the first center wall 16 of the lower half 4.

Numeral 31 indicates a third presser wall which extends downwardly generally perpendicular from a top wall surface 32 of the upper half 3, so as to fall between the second center wall 29 and one end of the second partition 25. The rear surface 33 of the third presser wall 31 falls within the same plane as the rear end edge 30 of the second center wall 29 and a receiving channel 34 is formed between this rear surface 33 and the third recess 28. Also, at the lower end of the rear surface 33 of the third presser wall 31, an inclined surface 33a is formed which slopes at the front. Further, the extent to which this third presser wall 31 protrudes from the top wall surface is approximately a fifth of that of the protrusion of the upper rear wall 26 from the top wall surface 32.

Numeral 35 indicates a second limiting wall which extends from a position towards the rear end of the second center wall 29 in the right direction as far as the right side wall 27. The extent of its protrusion from the top wall surface 32 is approximately the same as the extent of the protrusion of the upper rear wall 26 from the top wall surface 32.

Figure 16:
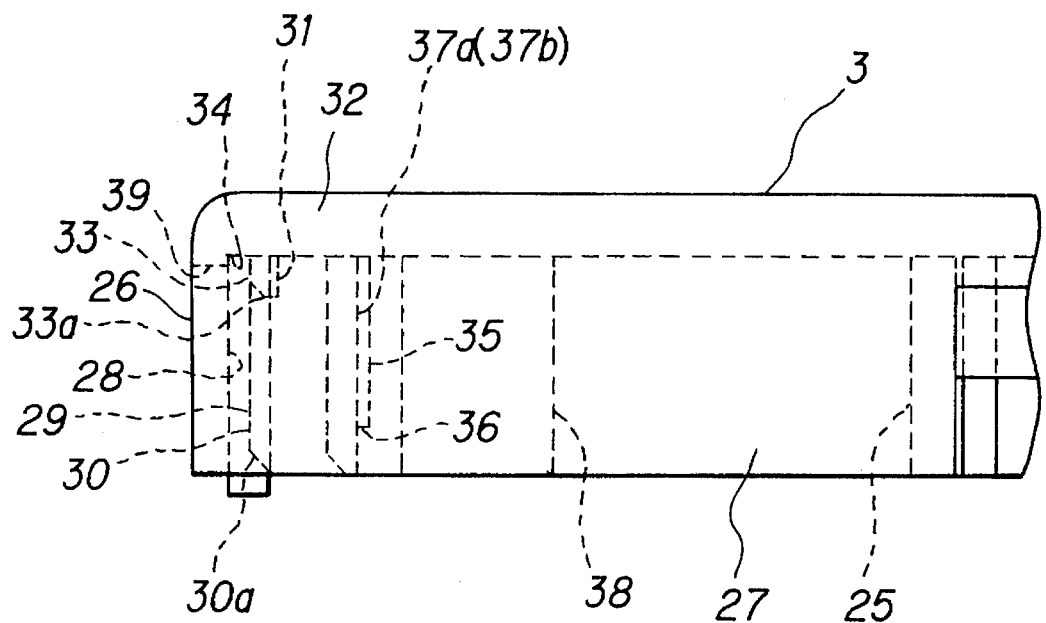
FIG. 16 is a right side view of the upper half of the portion of the cassette case shown in FIG. 2.
Figure 17:
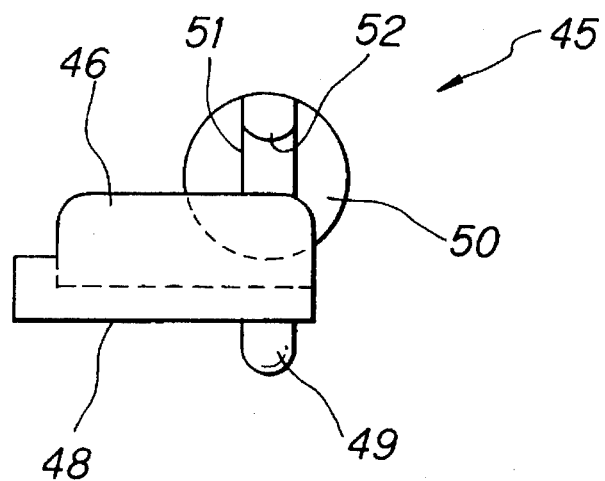
FIG. 17 is an enlarged plan view of the accidental erasure prevention member incorporated in the cassette case of the present invention.
Figure 18:
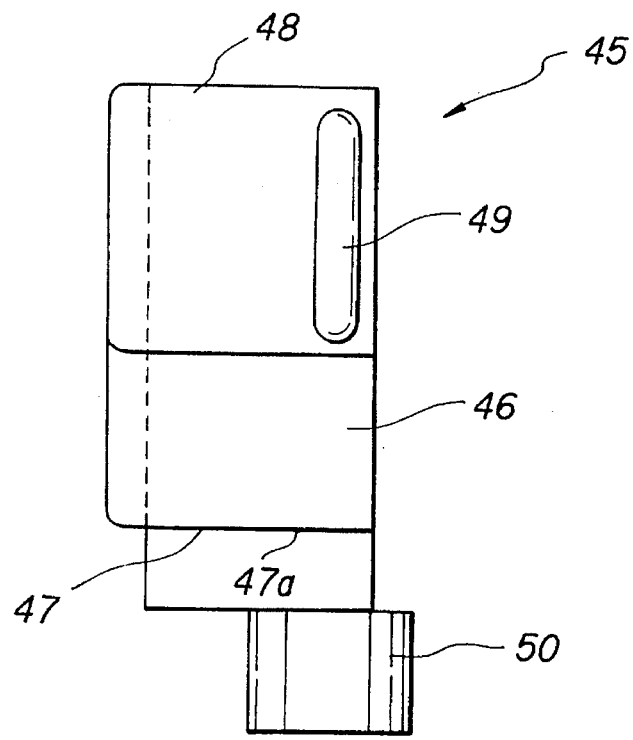
FIG. 18 is an enlarged rear view of the accidental erasure prevention member incorporated in the cassette case of the present invention.
Figure 19:
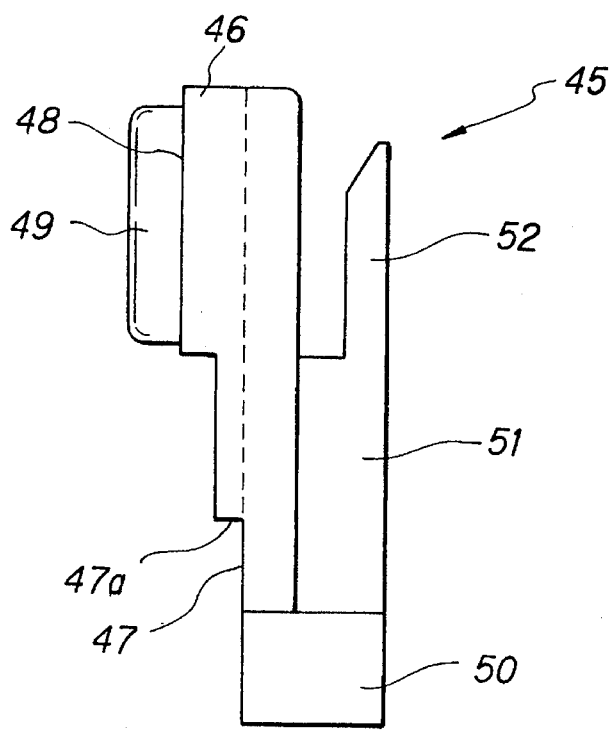
FIG. 19 is an enlarged right side view of the accidental erasure prevention member incorporated in the cassette case of the present invention.
Figure 20:
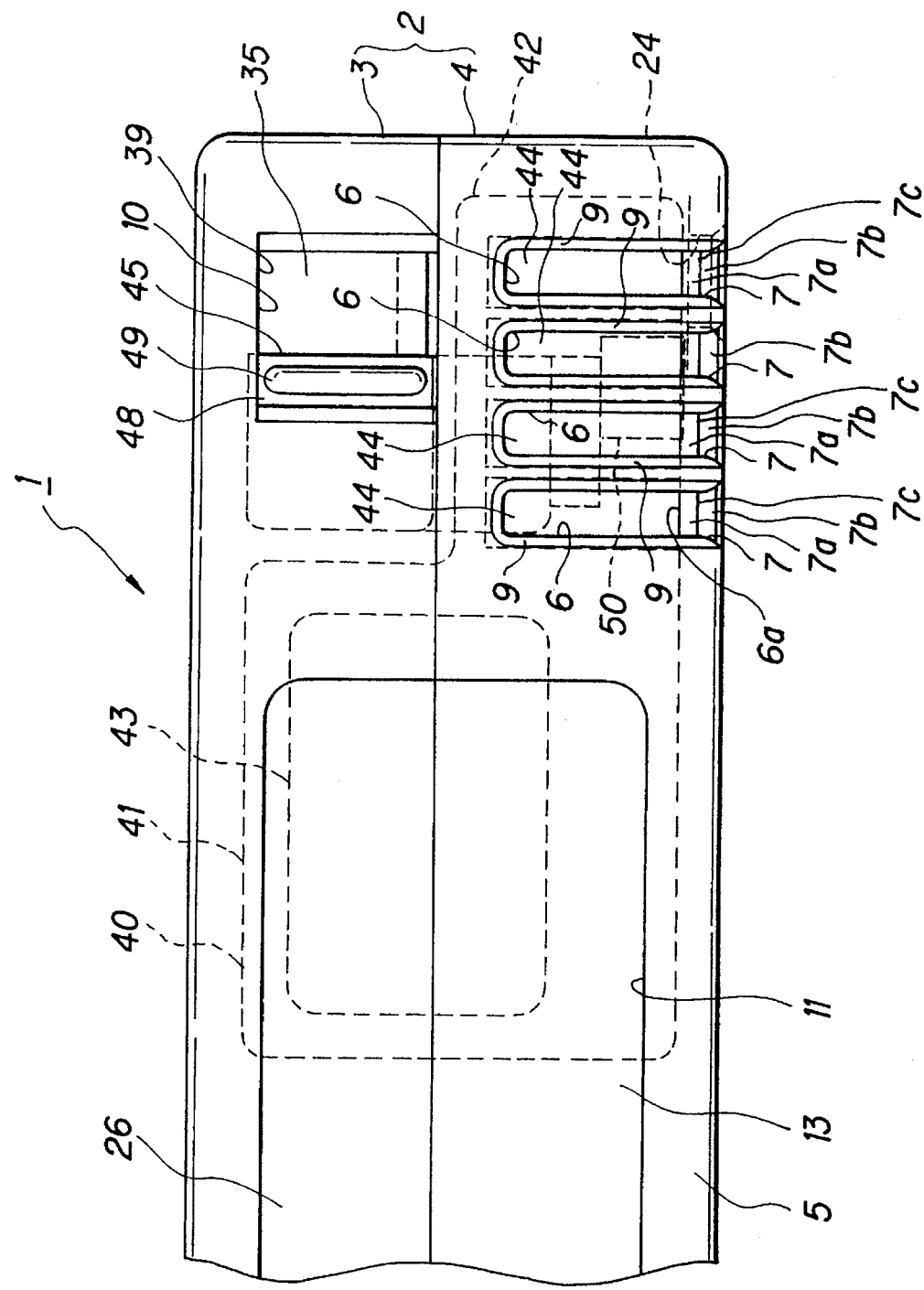
FIG. 20 is an enlarged view of the right side portion of the cassette case of FIG. 1 wherein the accidental erasure prevention member in the position where recording is permitted.
Figure 21:
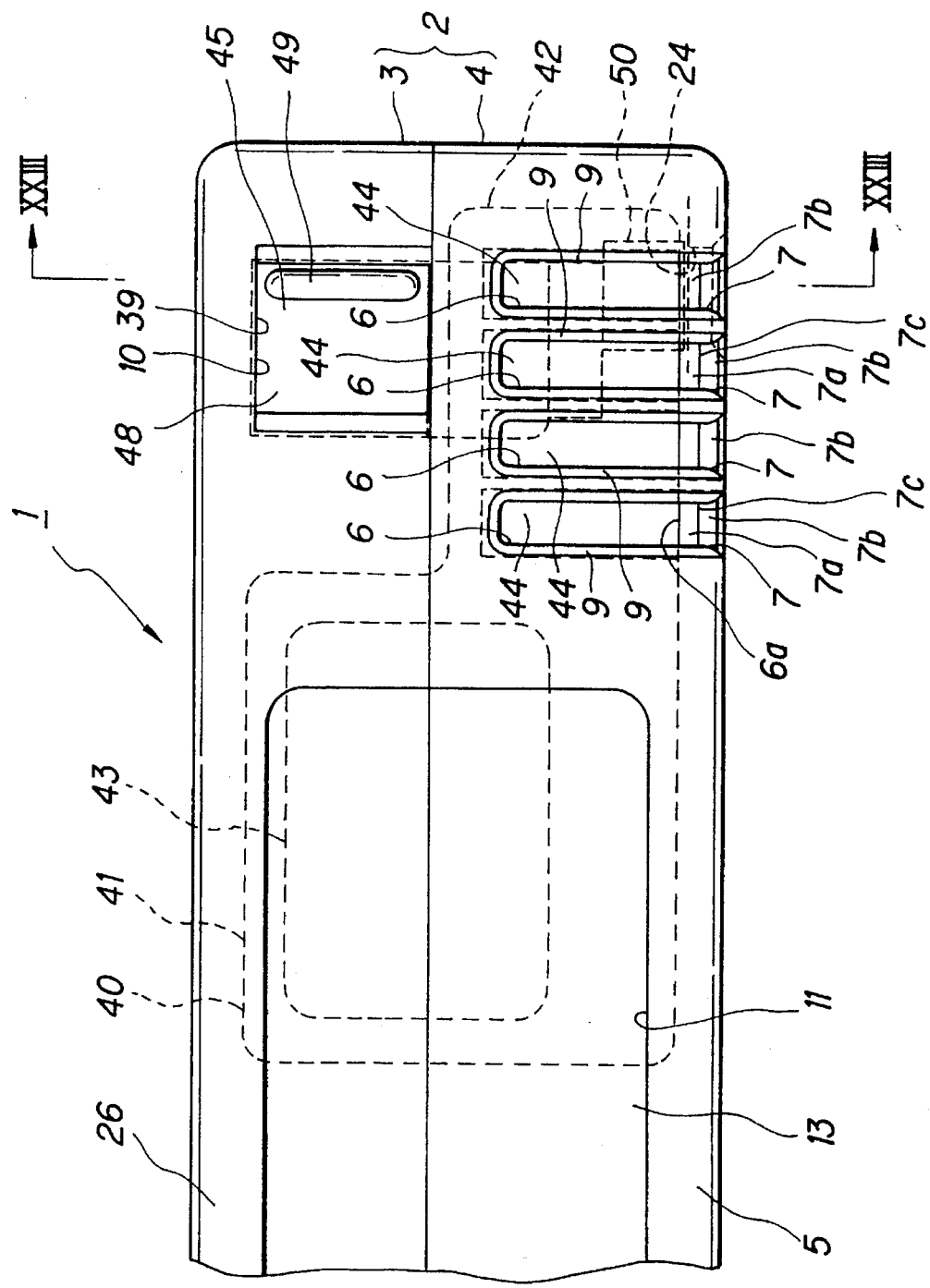
FIG. 21 is an enlarged view of the right side portion the cassette case of FIG. 1 wherein the accidental erasure prevention member in the position where recording is not permitted.
Figure 22:
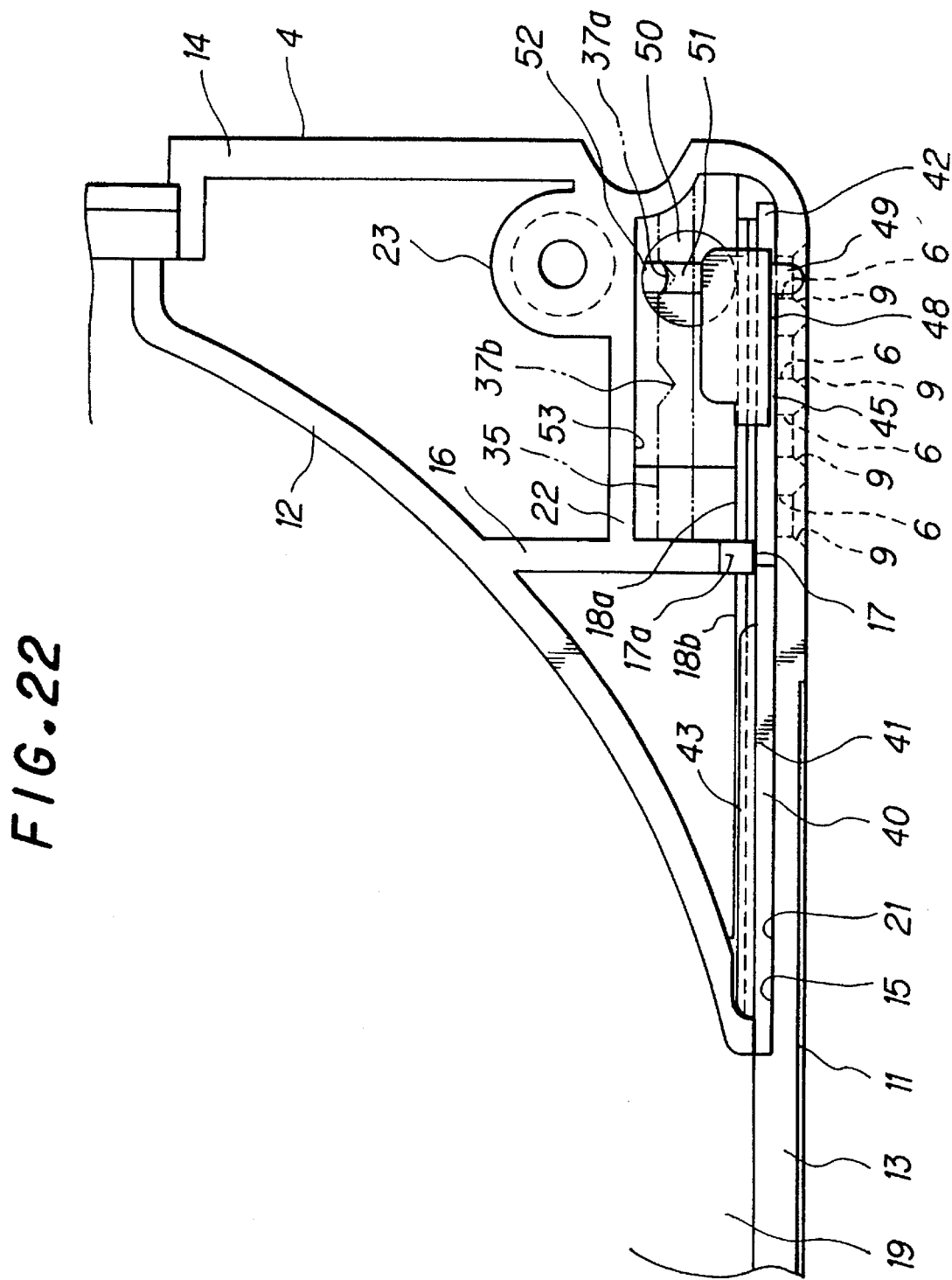
FIG. 22 is a plan view of that shown in FIG. 21 with the upper half removed.
Figure 23:
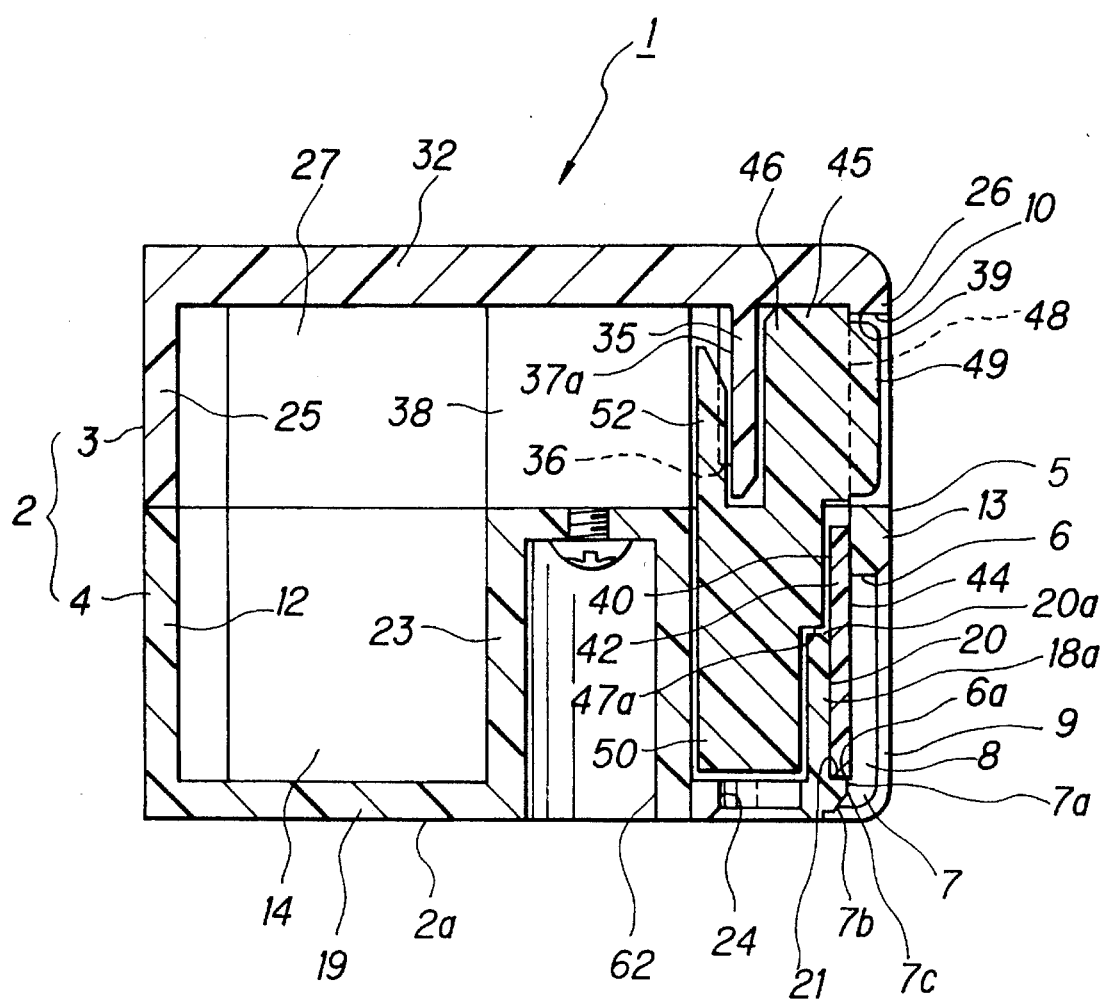
FIG. 23 is a cross-sectional view taken along line XXIII—XXIII of FIG. 21.
Figure 24:
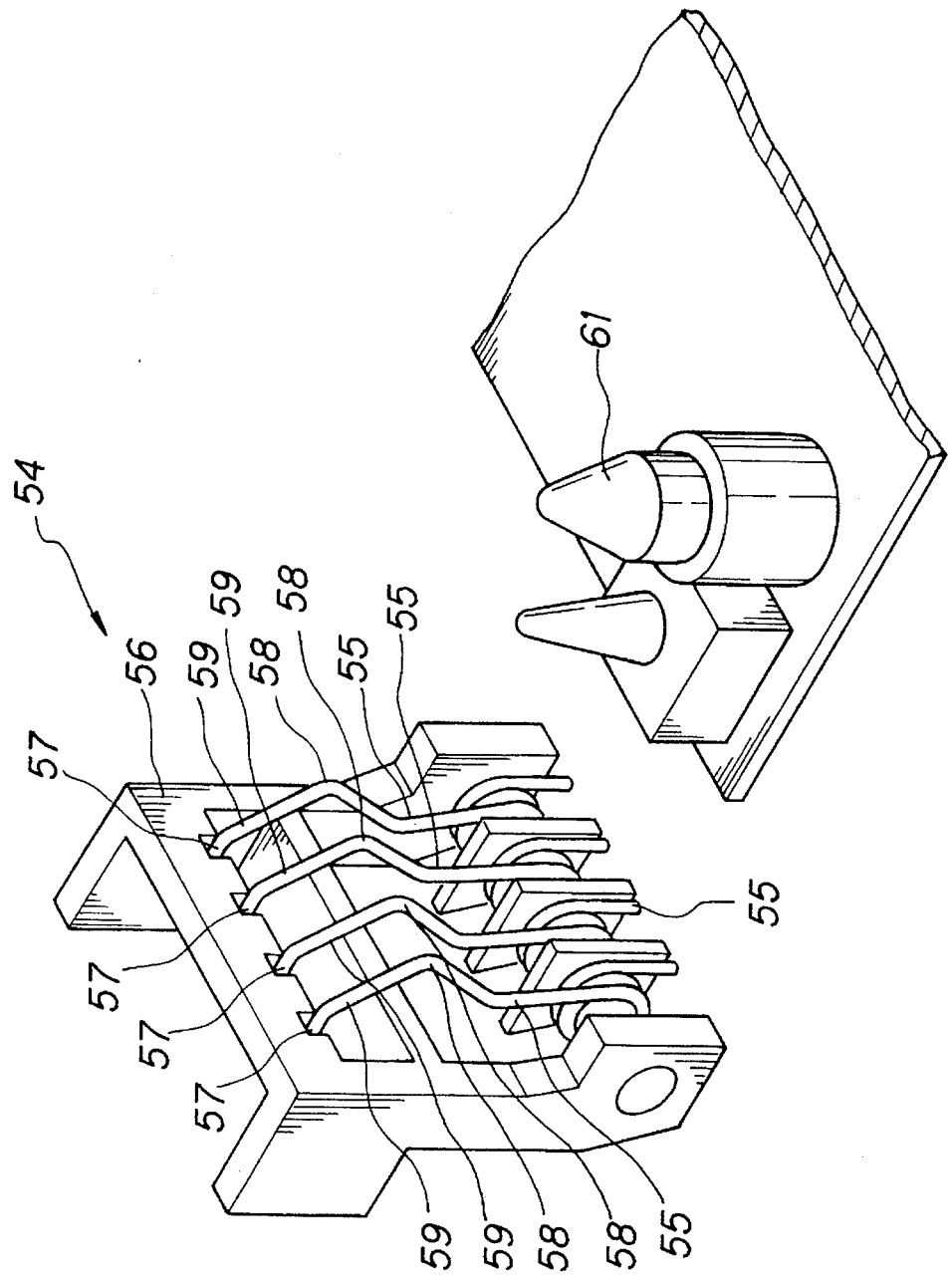
FIG. 24 is a perspective view of the connection contacts, connection points, etc. of a recording/playback apparatus into which the cassette case of FIG. 1 may be inserted.

A first notch 36 is formed at the lower end part of the front surface of the second limiting wall 35 so as to run along its entire length. Also, first and second click channels 37a and 37b (see FIG. 16) which extend upwardly and downwardly are formed at two places, one in the approximate center with respect to the right and left directions of the front surface of the portion excluded from the first notch 36 and one at the center of this center and the right end thereof.

The numeral 38 indicates an upper hub which extends downwardly from the roof wall surface 32 at a position just slightly to the front of the right end part of the second limiting wall. The upper hub 38 is formed so that its position corresponds with the lower hub 23 of the lower half.

Numeral 39 indicates a slightly elongated second notch formed in the right end of the upper rear wall 26. When the upper and lower halves 3 and 4 are then joined, the accidental erasure prevention window 10 is formed from this second notch 39 and the upper edge of the lower rear wall 13 for the lower half 4.

Numeral 40 indicates a rectangular cassette case board, the height of which is about half that of an IC mounting part 41 which is in the shape of an elongated rectangle elongated across its width, and the width of which is slightly less than that of the IC mounting part 41. The cassette case board 40 is formed as a single piece together with a terminal arrangement part 42 which protrudes from the lower half of the right end of the IC mounting part 41 in the right-hand side direction. An IC 43 is mounted on the front surface of the IC mounting part 41 and a plurality of vertical board terminals 44, 44, . . . are arranged from left to right on the rear surface of the terminal arrangement part 42. These board terminals 44, 44, . . . are then connected to IC 43.

The lower end part of this cassette case board can therefore be inserted into the receiving channel formed in the lower half 4. When the lower and upper halves 3 and 4 are then joined together, the upper end of the IC mounting part 41 for the cassette case board 40 is inserted into the receiving channel 34 formed in the lower half 3. In this way, the cassette case board 40 is arranged in the rear right part of the cassette case 2. The cassette case board terminals 44, 44, . . . for the cassette case board 40 are then each individually exposed in the rear direction from the positioning holes 6, 6, . . . formed in the lower rear wall 13 of the lower half 4.

The lower end of the terminal arrangement part 42 of the cassette case board 40 inserted within the cassette case 2 rests on the step 6*a* of the part in which the positioning holes 6, 6, . . . are formed. However, the rear surface of the terminal arrangement part i.e. the surface in which the board terminals 44, 44, . . . are formed projects slightly from the rear end of the step 6*a* (refer to FIG. 26 etc.).

Numeral 45 indicates an accidental erasure prevention member which is made from a slightly resilient composite resin.

Numeral 46 indicates the main part of the accidental erasure prevention member 45, which when viewed from behind appears as a flat-shaped rectangle with the long sides thereof pointing upwardly. A third notch 47 is also formed so as to run along the entire length of the lower end part of the main part 46.

Numeral 48 indicates a display part which is formed so as to be exposed slightly in a direction going towards the rear from approximately the upper half of the main part 46. A rib-shaped finger catch 49 extends upwardly and downwardly along the right-end part of the front surface of this display part 48 so as to protrude therefrom. The front surface of the display part 48 is also painted red.

Numeral 50 indicates a circular board-shaped open/close stopper, which is formed so as to protrude forwardly of the right-end part of the lower end of the main part 46.

Numeral 51 indicates a rib which extends from the upper surface of the open/close stopper 50 and is of a height which is approximately half that of the main part 46. Also, a clicker 52 protrudes in an upward direction from the front half of the upper surface of the rib 51 in such a manner that when the rear surface of this clicker 52 is viewed from above it appears as a circular arc.

The installation of an accidental erasure prevention member 45 into a cassette case 2 is carried out in the following way.

First, the lower half of the accidental erasure prevention member 45 i.e. the portion which is lower than the display part 48 is arranged within the space 53 defined by the lower rear wall 13, right side wall 14, first partition 12 and first center wall 16 of the lower half 4. At this time, the upper surface 47*a* of the third notch 47 in the accidental erasure prevention member 45 rests on the upper edge of the first presser wall 18*a* in the lower half 4. Also, the finger catch 49 is positioned within the accidental erasure prevention window 10.

If the upper half 3 and the lower half 4 are then joined together, the limiting wall 35 for upper half 3 is inserted between the upper half of the main part 46 of the accidental erasure prevention member 10 and the clicker 52. In this way, the front surface of the upper half of the main part 46 contacts the limiting wall 35 in such a manner that shifting of the accidental erasure prevention member 45 in the forward direction is restricted.

In this way, the erasure prevention member 45 is fitted within the cassette case 2 so as to be moveable in the left and right directions within the space 53. In addition, the accidental erasure prevention material 45 is installed so as to be movable between a first position, wherein the open/close stopper 50 is stopped by the insertion guide hole 24 of the cassette case 2 so that recording is not possible, and a second position, wherein the open/close stopper 50 is positioned out from the insertion guide hole 24 of the cassette case 2 so as to be released from the insertion guide hole 24 and thereby permit recording to occur.

Therefore, when the accidental erasure prevention member 45 is in the recording prevention position, the clicker 52 abuts the click channel 37*a* on the right-hand side. When it is in a position which allows recording, the clicker 52 abuts the right side click channel 37*b*. Both of these positions are such that the click stop is activated. Also, when moving from the recording not permitted position to the recording permitted position, or when moving from the recording permitted position to the recording not permitted position, the clicker 52 is slack and is brought out of the first or second click channel 37*a* or 37*b* depending on the force applied to move the accidental erasure prevention member 45.

Numeral 54 indicates a connector which is set up at the recording playback apparatus and has a plurality of connector contacts 55, 55, . . . which come into contact with the board terminals 44, 44 of the tape cassette 1. The connector contacts 55, 55 are made from a conductive wire spring material with at least one of the ends being fixedly supported by the case 56 and the other ends 57 being free.

The portions of the connector contacts 55 which approach the free end 57 are bent into the shape of a bent arm, with the bent portion protruding to the greatest extent 58 at the point of contact. This is then inclined in an upward direction towards the rear from the contact point 58 to the upper portion 59.

The free end 57 is comprised of a horizontal part 57*a* which is extended horizontally from the upper end of the inclined portion 59 towards the rear and a stop part 57*b* which rises directly upwardly from the rear end of the horizontal part 57*a*.

Figure 25:
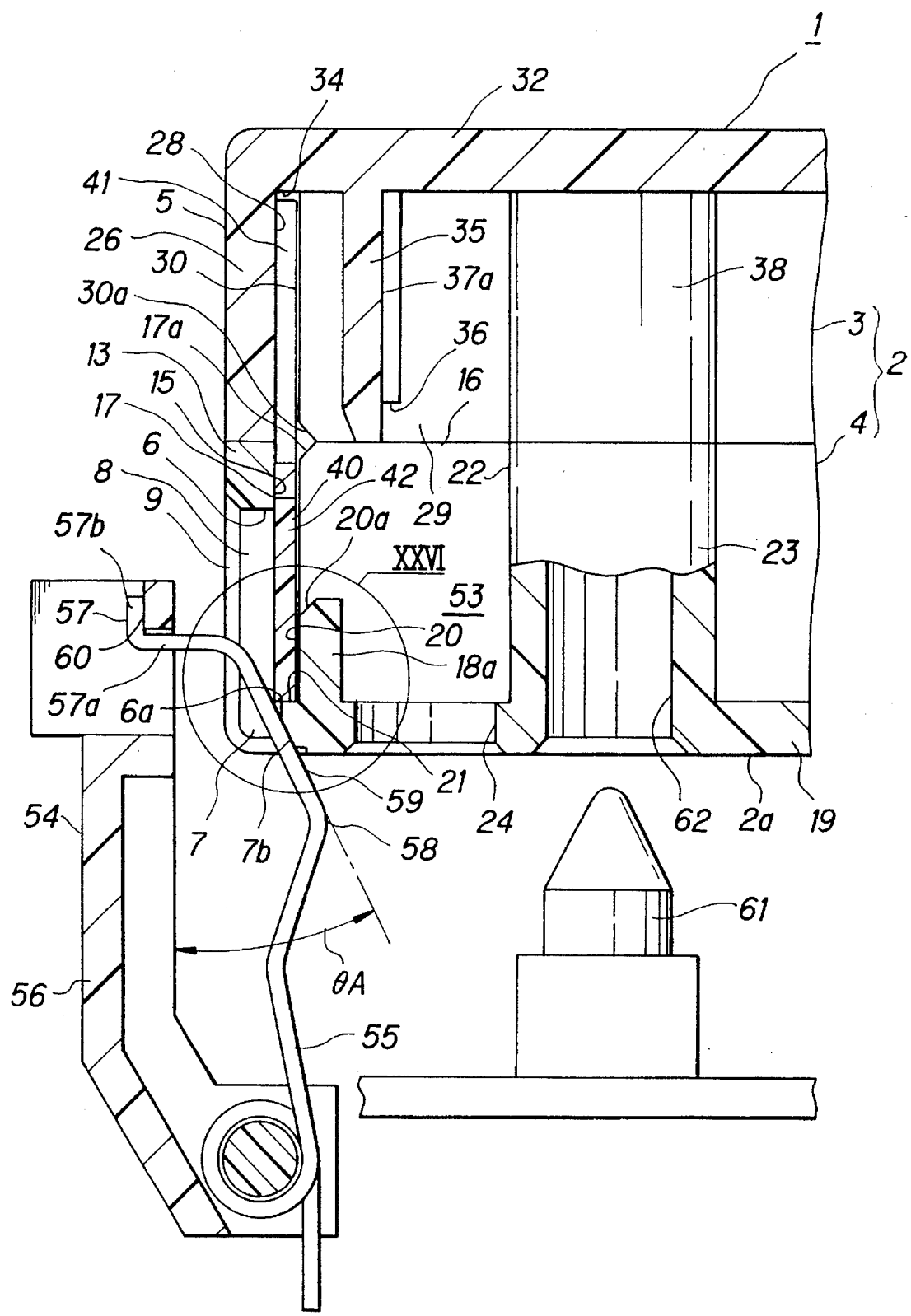
FIG. 25 is a cross-sectional side view showing a recording medium cassette of the present invention being installed in the recording/playback apparatus in a cassette installation position.

Torque is exerted on the free end 57 in the forward direction due to the elasticity of the material used for the connector contacts 55. When not in contact, the position is limited due to the stopper 57*b* contacting a stopper step 60 formed at the upper end of the case 56 (see FIG. 25). Therefore, at the time shown in FIG. 25 when contact is not made, the angle $\Theta A$ which the inclined portions 59 of the connector contacts 55 makes with respect to the height of the cassette case 2 is smaller than the angle $\Theta B$ that the release portion 7*b* of the insertion guide channel 7 for the cassette case 2 makes with respect to the height of the cassette case 2. For example, $\Theta A$ is set at approximately 250 whereas $\Theta B$ is set at approximately 300.

Further, numeral 61 indicates a reference insertion member provided in the recording/playback apparatus and numeral 62 indicates a reference hole formed as an opening in the lower surface 2*a* of the cassette case 2 at the lower hub 23. Therefore, when the tape cassette 1 is installed in the recording/playback apparatus, the position of the tape cassette 1 within the recording/playback apparatus is stabilized due to the inserting of the reference insertion member 61 into the reference hole 62, and more particularly, the position is predetermined in the horizontal and vertical directions. Also, a number of these reference axes 61 and reference holes 62 for this kind of item may be set up at the recording/playback apparatus and the tape cassette 1.

When the tape cassette 1 is lowered into the cassette installation part of the recording/playback apparatus, the contact points 58, 58, . . . of the connector contact terminals 55, 55, . . . for the connector 54 reach the positioning holes 6, 6, after having been guided by the insertion guide channels 7, 7, . . . of the cassette case 2. They are then guided by the positioning holes 6, 6, . . . so as to each separately contact the board terminals 44, 44, . . . of the cassette case board 40. In this way, the reading part of the recording/playback apparatus which is connected to the connector contacts 55, 55, . . . and which is not shown in the diagram can read the information recorded in the IC 43.

A description of the conditions for the board terminals 44, 44, . . . of the tape cassette 1 contacting the connector contacts 55, 55, ... when the tape cassette 1 is installed in the recording/playback apparatus is set forth below.

When the tape cassette 1 is inserted, the inclined portions 59, 59 of the connector contacts 55, 55, ... enter into the insertion guide channels 7, 7, .... At this time, as mentioned previously, the tape cassette 1 has a certain degree of freedom within the loading mechanism i.e. it is supported with a certain amount of play to the left and right, front and back. As a result thereof, the connector contacts 55, 55, ... can move to a certain extent to the left and right with respect to the insertion guide channels 7, 7, ... and the positioning holes 6, 6, .... Also, as set forth above, the chamfer-shaped inclined guide surface 9 runs along the upper, side, and lower edges of the opening in the side part 8 which defines both sides of the portion which extends from the positioning holes 6 to the guide channel 7. This inclined guide surface 9 creates a substantial enlargement in the horizontal direction of the region in which the positioning holes 6, 6, ... and the insertion guide channels 7, 7, ... are formed. Therefore, even if there are slight movements in the left and right directions with regards to the insertion guide channels 7, 7, ... for the connector contacts 55, 55, ... or the positioning holes 6, 6, ..., the connector contacts 55, 55 are guided safely into the insertion guide channels 7, 7, ... and the positioning holes 6, 6, ... by the inclined guide surface 9, 9, ....

Figure 26:
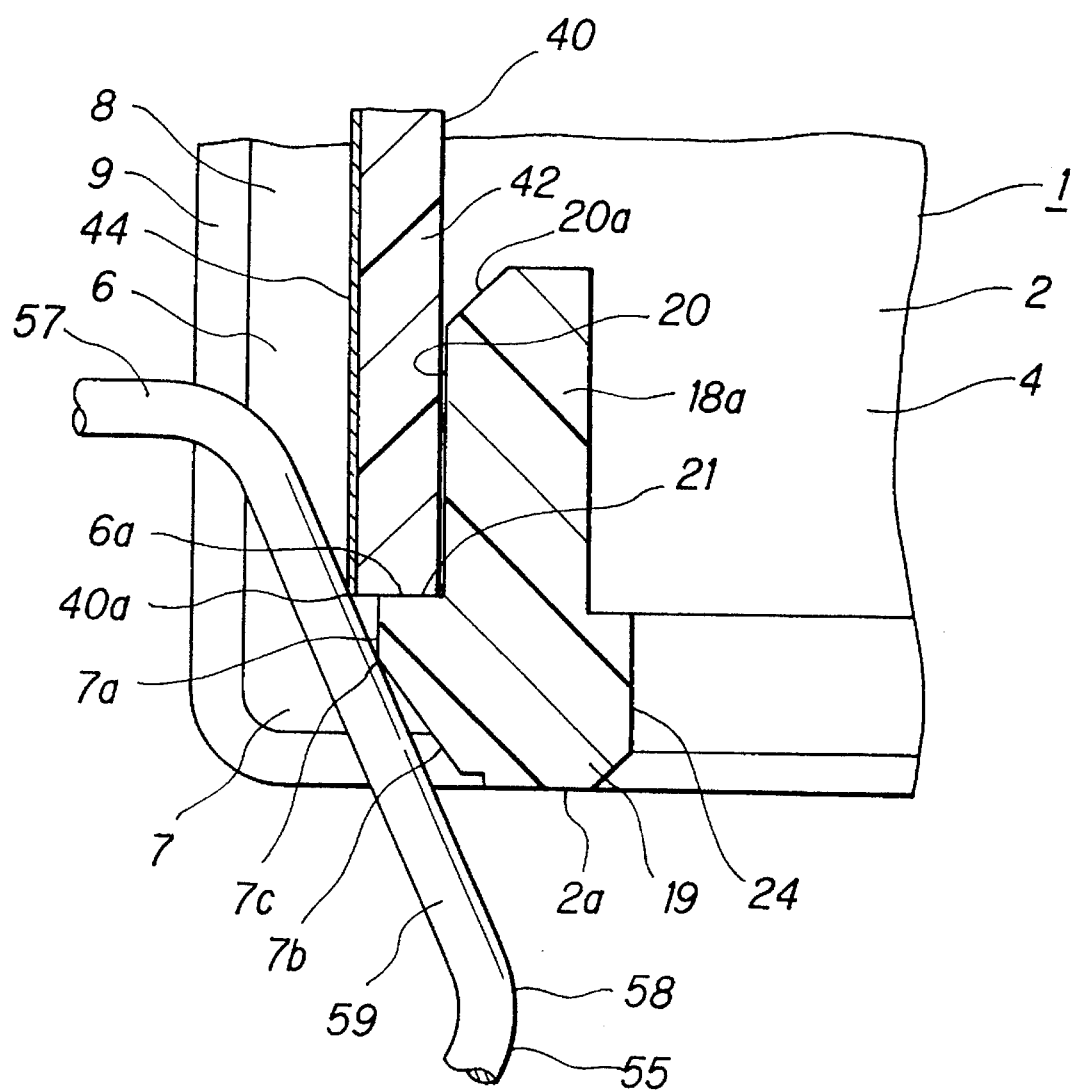
FIG. 26 is an enlarged cross-sectional side view of the section designated as XXVI of FIG. 25.
Figure 27:
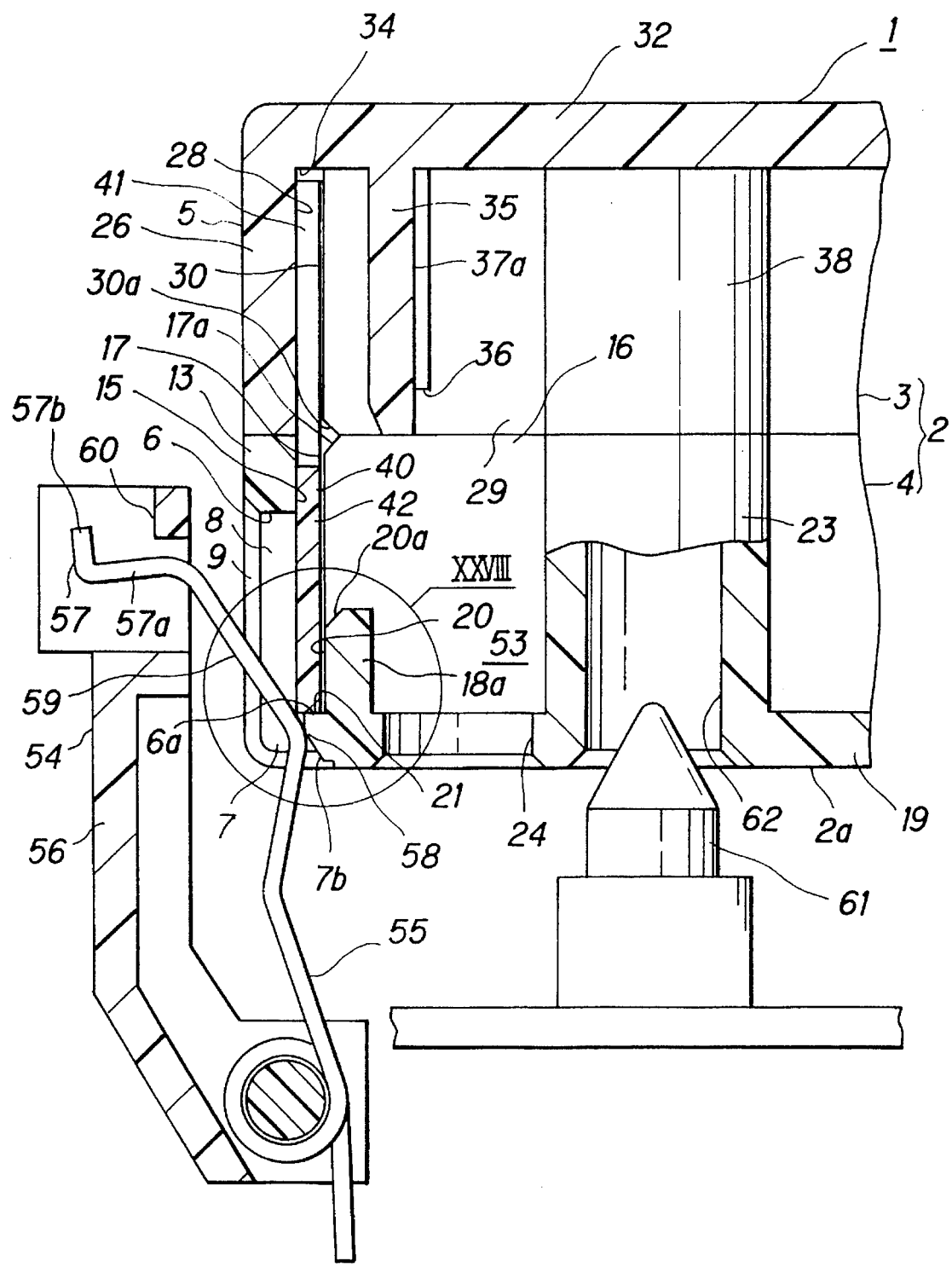
FIG. 27 is a cross-sectional side view of the essential parts of the present invention in its loaded condition as in FIG. 25 if the conditions of FIG. 25 continue.

The parts of the cassette case which the connector contacts 55,55, ... initially come into contact with are the vertical parts 7a, 7a, the release portion 7b, 7b, ... and the ridges 7c of the insertion guide channels 7, 7 (see FIG. 26). Here, the relationship between the angle ΘA of the inclined portion 59 of the connector contacts 55 and the angle ΘB of the release portions 7b is ΘA<ΘB, as mentioned above. In this way, as the connector contacts 55, 55 initially contact the ridges 7c, 7c, ... first, the sliding distance between the cassette case 2 made of a composite resin material and the connector contacts 55, 55 made from metal can be kept to a minimum, as can the generation of dust due to wear.

Figure 28:
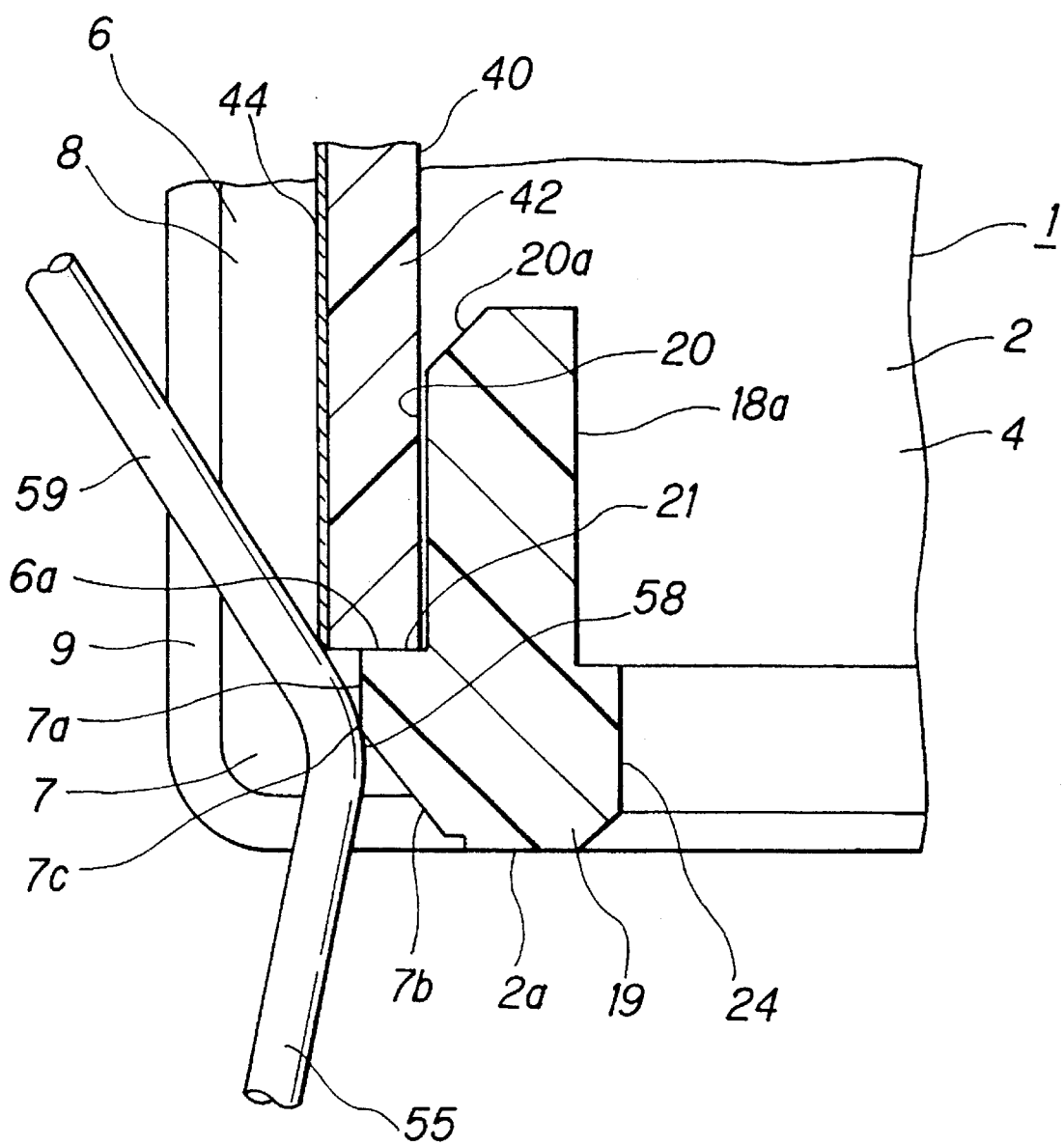
FIG. 28 is an enlarged cross-sectional view of the section designated as XXVIII in FIG. 27.

Next, the surfaces formed by the board terminals 44, 44 ... of the cassette case board 40 protrude slightly from the rear end of the step 6a. The connection points 58, 58, ... of the connector contacts 55, 55, ... therefore contact the lower edge 40a of the surfaces formed by the board terminals 44, 44, ... of the cassette case board 40 (see FIG. 28). In this way, the contact points 58, 58, ... are cleaned.

Figure 29:
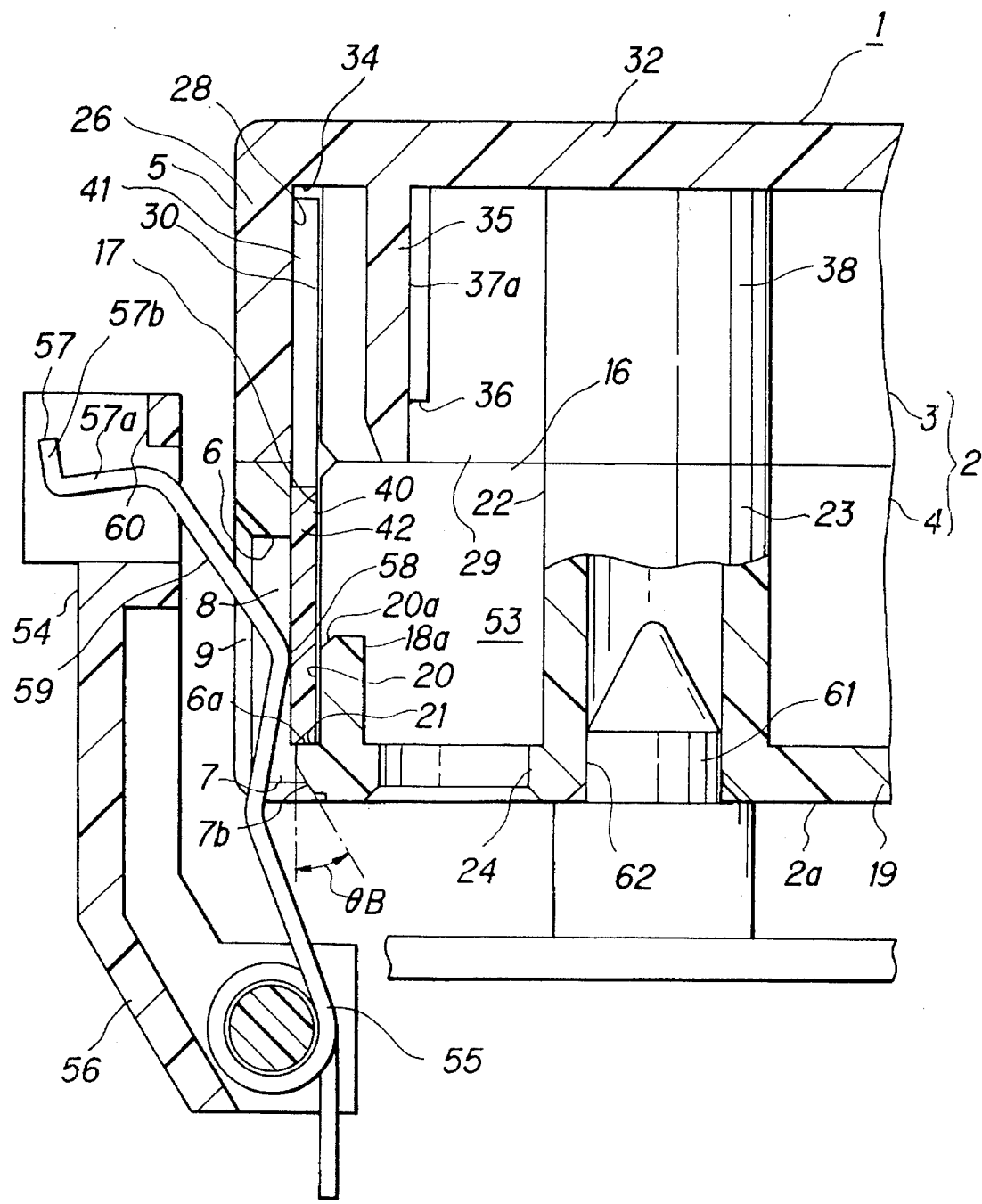
FIG. 29 is a cross-sectional side view showing a recording medium cassette case of the present invention being installed into the cassette installation position in the recording/playback apparatus.

Finally, when the tape cassette 1 is installed in the prescribed cassette installation position, the connection points 58, 58, ... of the connector contacts 55, 55, ... contact the board terminals 44, 44, ... (see FIG. 29).

Therefore, as becomes clear from the above, in the present invention a recording medium cassette comprises a cassette case, a cassette case board and a release part. The cassette case board has a plurality of board terminals and positioning holes which are formed in the outer surface of the cassette case so as to expose the plurality of board terminals. Insertion guide channels are formed consecutively at the outer surface of the cassette case at the lower ends of the positioning holes so as to extend to the lower end of the cassette case. Also, a release part slopes towards the lower end of the insertion guide channel away from the outer surface. Here, the angle of the release part with respect to the height of the cassette case is greater than the angle of an inclined portion, which spans from contact points to fee end parts of resilient connector contacts set up at a recording/playback apparatus connector, with respect to the height of the cassette case. In this manner, the connector contacts do not contact the release part when the recording medium cassette is installed in the recording/playback apparatus.

As a result, according to the recording medium cassette in this invention, when the recording medium cassette is inserted into the installation position, the connector contacts are first inserted to the insertion guide channels and are then guided by these guide channels into the positioning holes from which the board terminals are exposed. The connector contacts are therefore accurately guided into the positioning holes for their corresponding board terminals.

Also, the incline of the release parts for the insertion guide channels is greater than the incline of the inclined portions of the connector contacts and the inclined portions of the connector contacts do not contact the release parts of the insertion guide channels but do contact a ridge at the upper end of the release parts for the guide input channels. This means that the generation of dust due to frictional rubbing between the connector contacts and the cassette case can be kept to a minimum.

The detailed forms and structures for each of the parts shown for the aforementioned embodiment are just a sample of the specific ways in which this invention can be carried out and the technology in this invention is by no means limited to this interpretation.

What is claimed is:

1. A recording medium cassette for insertion into a recording/playback apparatus comprising:

a cassette case;

a cassette case board having a plurality of board terminals and disposed in the cassette case;

positioning holes formed in an outer surface of the cassette case so as to expose the plurality of board terminals;

a plurality of insertion guide channels being formed in the outer surface aligned at lower ends of the positioning holes so as to reach a bottom edge of the cassette case; and a release part sloping towards lower ends of the insertion guide channels and sloping away from the outer surface of the cassette case, wherein an angle of the release part with respect to a height of the cassette case is greater than an angle of an inclined portion, which extends from contact points provided at the free end parts of resilient connector contacts formed in a recording/playback apparatus connector, with respect to the height of the cassette case so that the connector contacts do not come into contact with the release part when the recording medium cassette is installed in the recording/playback apparatus.

2. The recording medium cassette according to claim 1, further comprising an inclined guide surface formed at circumferences of the positioning holes and the insertion guide channels at the outer surface of the cassette case in such a manner as to guide the connector contacts to the positioning holes and the insertion guide channels.

3. The recording medium cassette according to claim 2, further comprising a step which defines the lower ends of the positioning holes and on which the lower end of the cassette case board rests, with a surface of the cassette case board extending outwardly to a greater extent than a front end of the step.

4. The recording medium cassette according to claim 3, further comprising a reference hole into which a reference insertion member for the recording/playback apparatus is inserted formed in the vicinity of the cassette case board equipped with the board terminals which extend from the positioning holes at a lower part of the cassette case.

5. The recording medium cassette according to claim 1, further comprising a step which defines the lower ends of the positioning holes and on which the lower end of the cassette case board rests, with a surface of the cassette case board extending outwardly to a greater extent than a front end of the step.

6. The recording medium cassette according to claim 1, further comprising a reference hole into which a reference insertion member for the recording playback apparatus is inserted formed in the vicinity of the cassette case board equipped with the board terminals which extend from the positioning holes at a lower part of the cassette case.

* * * * *